United States Patent
Fujikawa et al.

(10) Patent No.: US 9,436,008 B2
(45) Date of Patent: Sep. 6, 2016

(54) HEAD-UP DISPLAY DEVICE

(71) Applicant: DENSO CORPORATION, Kariya, Aichi (JP)

(72) Inventors: Takayuki Fujikawa, Nagoya (JP); Hiroshi Ando, Nagoya (JP); Masayuki Yamaguchi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/766,029

(22) PCT Filed: Feb. 3, 2014

(86) PCT No.: PCT/JP2014/000553
§ 371 (c)(1),
(2) Date: Aug. 5, 2015

(87) PCT Pub. No.: WO2014/122912
PCT Pub. Date: Aug. 14, 2014

(65) Prior Publication Data
US 2015/0370068 A1 Dec. 24, 2015

(30) Foreign Application Priority Data

Feb. 6, 2013 (JP) .................................. 2013-021729
Sep. 20, 2013 (JP) .................................. 2013-195857

(51) Int. Cl.
| G02B 5/18 | (2006.01) |
| G02B 27/01 | (2006.01) |
| B60K 35/00 | (2006.01) |
| G02B 27/48 | (2006.01) |
| G02B 5/02 | (2006.01) |
| G06T 19/00 | (2011.01) |
| G02B 26/10 | (2006.01) |
| G02B 3/00 | (2006.01) |

(52) U.S. Cl.
CPC ........... *G02B 27/0101* (2013.01); *B60K 35/00* (2013.01); *G02B 5/021* (2013.01);
(Continued)

(58) Field of Classification Search
CPC .. G02B 5/021; G02B 5/1861; G02B 5/1842; G02B 26/10; G02B 26/101; G02B 26/105; G02B 26/123; G02B 2027/013; G02B 2027/0118; G02B 2027/0112; G02B 26/0833; G02B 27/01; G02B 27/0101; G02B 2027/0159; G02B 2027/0114; G02B 227/095; G02B 27/48; B60K 35/00; B60K 2350/2056; B60K 2350/2065
See application file for complete search history.

(56) References Cited

U.S. PATENT DOCUMENTS

2006/0227293 A1    10/2006   Kasazumi et al.
2009/0135374 A1     5/2009   Horiuchi et al.
(Continued)

FOREIGN PATENT DOCUMENTS

JP    H07270711 A    10/1995
JP    2007233017 A    9/2007
(Continued)

OTHER PUBLICATIONS

U.S. Appl. No. 14/766,069, publication date Aug. 5, 2015, Ando et al.
(Continued)

*Primary Examiner* — James Phan
(74) *Attorney, Agent, or Firm* — Harness, Dickey & Pierce, P.L.C.

(57) ABSTRACT

An HUD device includes a laser scanner that projects laser light carrying a display image, and a screen member that has a plurality of optical elements arrayed in the form of a grating, and diffuses laser light which emanates from the laser scanner and enters the optical elements toward a projection surface. The optical elements have curved surfaces, which take on a convexly curved form as a common curved form, formed as their faces, and diffuse laser light which is emitted to the projection surface from the curved surfaces. A sag quantity from each of surface vertices of the curved surfaces to each of boundaries among the optical elements differs between adjoining optical elements.

27 Claims, 29 Drawing Sheets

(52) U.S. Cl.
CPC ......... *G02B 5/1842* (2013.01); *G02B 5/1861* (2013.01); *G02B 27/48* (2013.01); *G06T 19/006* (2013.01); *G02B 3/0056* (2013.01); *G02B 26/10* (2013.01); *G02B 2027/013* (2013.01); *G02B 2027/0112* (2013.01); *G02B 2027/0118* (2013.01)

(56) References Cited

U.S. PATENT DOCUMENTS

| | | | | |
|---|---|---|---|---|
| 2013/0050834 | A1* | 2/2013 | Fujikawa | G02B 27/0101 359/630 |
| 2015/0042542 | A1* | 2/2015 | Fujikawa | G02B 27/0101 345/7 |

FOREIGN PATENT DOCUMENTS

| | | |
|---|---|---|
| JP | 2008151992 A | 7/2008 |
| JP | 2009128659 A | 6/2009 |
| JP | 2010145746 A | 7/2010 |
| JP | 2012163613 A | 8/2012 |
| WO | WO-2005008330 A1 | 1/2005 |

OTHER PUBLICATIONS

International Search Report and Written Opinion (in Japanese with English Translation) for PCT/JP2014/000553, mailed Apr. 15, 2014; ISA/JP.

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2014/000553 filed on Feb. 3, 2014 and published in Japanese as WO 2014/122912 A1 on Aug. 14, 2014. This application is based on and claims the benefit of priority from Japanese Patent Applications No. 2013-021729 filed on Feb. 6, 2013 and No. 2013-195857 filed on Sep. 20, 2013. The entire disclosures of all of the above applications are incorporated herein by reference.

TECHNICAL FIELD

The present disclosure relates to a head-up display device that projects a display image onto a projection surface of a moving entity such as a vehicle, and thus displays a virtual image of the display image so that the virtual image can be discerned inside the moving entity.

BACKGROUND ART

Conventionally, a head-up display device (hereinafter, an HUD device) that realizes display of a virtual image of a display image by diffusing laser light, which carries the display image, using a screen member so as to introduce the laser light to a projection surface has been known.

For example, an HUD device disclosed in patent literature 1 diffuses laser light, which enters a screen member after being projected from a projector, using a plurality of optical elements which are arrayed in the form of a grating. The laser light thus diffused and projected onto a projection surface is discerned as a virtual image of a display image by a discerning person inside a moving entity.

PRIOR ART LITERATURE

Patent Literature

Patent literature 1: JP 2009-128659 A

SUMMARY OF INVENTION

However, when laser light of high coherence enters a pattern of optical elements that have regularity owing to their grating-like array, and then diffuses, a variance occurs in luminance which a discerning person who discerns the laser light as a virtual image perceives.

The present disclosure is made in view of such an issue, and it is an object of the present disclosure to provide an HUD device capable of suppressing a luminance variance.

The present inventors have conducted profound studies on a screen member that diffuses laser light using optical elements and emits the laser light. As a result, the present inventors have gotten such findings that when laser light rays emitted from curved surfaces of faces of adjoining optical elements interfere with each other, diffracted light exhibiting an intensity distribution that has plural orders of diffraction peaks associated with emission angles is generated, and a luminance variance is derived from such multiple diffraction.

According to a first aspect of the present disclosure devised based on the foregoing findings, a head-up display device projects a display image onto a projection surface of a moving entity and thus displays a virtual image of the display image so that the virtual image can be discerned inside the moving entity, and includes a projector that projects laser light carrying the display image, and a screen member that has a plurality of optical elements arrayed in the form of a grating, and diffuses and introduces the laser light, which emanates from the projector and enters the optical elements toward the projection surface. The optical elements have curved surfaces, which are either convexly curved or concavely curved and take on a common curved form, formed as their faces, and diffuse the laser light which is emitted to the projection surface from the curved surfaces. A sag quantity from each of surface vertices of the curved surfaces to each of boundaries among the optical elements differs between adjoining optical elements.

In the head-up display device according to the first aspect, the adjoining optical elements emit laser light from the curved surfaces of their faces which are either convexly curved or concavely curved and take on a common curved form. Therefore, an intensity distribution of diffracted light stemming from interference of emitted light rays has plural orders of diffraction peaks associated with emission angles. However, when a sag quantity from each of the surface vertices of the curved surfaces to each of the boundaries among the optical elements differs between adjoining optical elements, diffraction peaks of diffracted light induced by one optical element and an adjoining optical element on one side of the optical element are deviated from diffraction peaks of diffracted light induced by the one optical element and an adjoining optical element on the other side of the optical element. By utilizing the deviation effect, the diffraction peaks of diffracted light induced by one optical element and an adjoining optical element on one side of the optical element are superposed on diffraction valleys of diffracted light induced by the one optical element and an adjoining optical element on the other side of the optical element. Accordingly, a luminance variance which a discerning person who discerns the diffracted light rays as a virtual image can be suppressed. Herein, the diffraction valley refers to a valley between diffraction peaks in the intensity distribution of diffracted light.

According to a second aspect of the present disclosure, in the head-up display device, the optical elements reflect laser light from the curved surfaces so as to diffuse the laser light and emit the laser light from the curved surfaces. Assuming that m denotes an odd number equal to or larger than 1, $\lambda$ denotes a wavelength of laser light, and $\Delta S$ denotes a difference between sag quantities of adjoining optical elements, a relation of $\Delta S \neq m \cdot \lambda/4$ is established. According to this feature, in case the optical elements reflect laser light from the curved surfaces so as to diffuse and emit the laser light, if the difference $\Delta S$ between the sag quantities of adjoining optical elements is consistent with $m \cdot \lambda/4$, there arises a fear that diffraction peaks of diffracted light may be superposed on diffraction peaks of another diffracted light. However, as long as the difference $\Delta S$ between the sag quantities of adjoining optical elements is inconsistent with $m \cdot \lambda/4$, superposition of diffraction peaks on other diffraction peaks can be reliably avoided. Therefore, credibility in an effect of suppression of a luminance variance which a discerning person perceives can be upgraded.

According to a third aspect of the present disclosure, in the head-up display device, the optical elements reflect laser light from the curved surfaces so as to diffuse the laser light and emit the laser light through an optical surface on a side opposite to a side on which the curved surfaces are formed. Assuming that m denotes an odd number equal to or larger than 1, λ denotes a wavelength of laser light, ΔS denotes a difference between sag quantities of adjoining optical elements, and n denotes a refractive index of a screen member, a relation of ΔS≠m·λ/4/n is established. According to this feature, in case the optical elements reflect laser light from the curved surfaces so as to diffuse the laser light and emit the laser light through the optical surface on the side opposite to the side on which the curved surfaces are formed, if the difference ΔS between sag quantities of adjoining optical elements is consistent with m·λ/4/n, there arises a fear that diffraction peaks of diffracted light may be superposed on diffraction peaks of another diffracted light. However, as long as the difference ΔS between the sag quantities of adjoining optical elements is inconsistent with m·λ/4/n, superposition of diffraction peaks on other diffraction peaks can be reliably avoided. Therefore, credibility in an effect of suppression of a luminance variance which a discerning person perceives can be upgraded.

According to a fourth embodiment of the present disclosure, in the head-up display device, the projector projects multi-color laser light which includes green laser light whose peak wavelength falls within a range from 490 nm to 530 nm. The peak wavelength of the green laser light is defined as λ. According to this feature, superposition of diffraction peaks on other diffraction peaks is avoided in consideration of the peak wavelength λ of the green laser light, which falls within the range from 490 nm to 530 nm, out of the multi-color laser light, that is, the peak wavelength λ of laser light exhibiting high luminous efficiency. Thus, an effect of suppression of a luminance variance which a discerning person perceives can be upgraded.

According to a fifth aspect of the present disclosure, in the head-up display device, the projector projects multi-color laser light which includes red laser light whose peak wavelength falls within a range from 600 nm to 650 nm. The peak wavelength of the red laser light is defined as λ. According to this feature, superposition of diffraction peaks on other diffraction peaks is avoided in consideration of the peak wavelength λ of the red laser light, which falls within the range from 600 nm to 650 nm, out of the multi-color laser light, that is, the peak wavelength λ of laser light exhibiting a large diffraction angle. Accordingly, a luminance variance that becomes noticeable at the large diffraction angle can be suppressed.

Assuming that MIN denotes a numerical value or formula of a lower limit and MAX denotes a numerical value or formula of an upper limit, a range from MIN to MAX expressed in the present description signifies a range encompassing both MIN and MAX, that is, a range equal to or larger than MIN and equal to or smaller than MAX.

The present inventors have gotten such findings that when laser light is emitted from a boundary between adjoining optical elements, emitted light exhibits an intensity distribution, which undulates depending on an emission angle, due to diffraction on the boundary, and a luminance variance is derived from the boundary diffraction.

According to a sixth aspect of the present disclosure, in the head-up display device, the optical elements are formed so that an element width between boundaries differs between adjoining optical elements. According to this feature, since laser light rays emitted from boundaries among adjoining optical elements interfere with each other due to diffraction, even when an undulatory intensity distribution appears in light rays emitted from the adjoining optical elements, the undulations in the intensity distributions are deviated from each other according to the difference in the element width. Accordingly, the light rays emitted from adjoining optical elements are discerned as a virtual image by a discerning person with the undulations in the intensity distributions deviated from each other. Therefore, an effect of further suppression of a luminance variance which the discerning person perceives can be exerted.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Embodiments of the present disclosure will be described below in conjunction with the drawings. The same reference signs will be assigned to corresponding components of the embodiments, whereby an iterative description may be omitted. If part of the components of each of the embodiments is described, the other components could be understood by applying the components of any other embodiment described previously. Aside from an explicitly presented combination of components in a description of any of the embodiments, parts of components of embodiments may be combined even if the combination is not explicitly mentioned as long as the combination poses no problem.

First Embodiment

Figure 1:
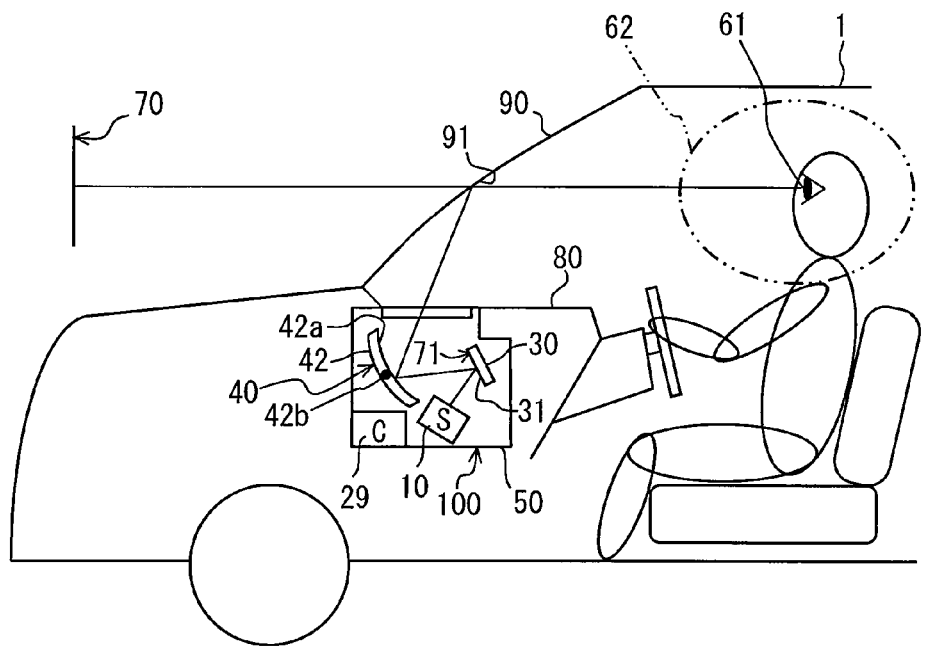
FIG. 1 is a schematic diagram showing a state of an HUD device in accordance with a first embodiment mounted in a vehicle.

As shown in FIG. 1, an HUD device 100 in accordance with the first embodiment of the present disclosure is mounted in a vehicle 1 that is a moving entity, and stowed in an instrumental panel 80. The HUD device 100 projects a display image 71 onto a windshield 90 of the vehicle 1 which serves as a display member. Herein, in the vehicle 1, the surface of the windshield 90 on an interior side is formed as a projection surface 91, onto which the display image 71 is projected, in a curved concave state or a flat planar state. In the vehicle 1, the windshield 90 may have an angle difference, which is intended to suppress an optical path difference, between its interior-side surface and exterior-side surface. Otherwise, the interior-side surface of the windshield 90 may be provided with a deposition sheet or film in order to suppress the optical path difference.

In the vehicle 1 in which the display image 71 is projected onto the projection surface 91, a luminous flux of the image 71 reflected from the projection surface 91 reaches an eye point 61 of a discerning person inside the vehicle. The discerning person perceives the luminous flux that has reached the eye point 61, and thus discerns a virtual image 70 of the display image 71 formed ahead of the windshield 90. Discernment of the virtual image 70 is enabled when the eye point 61 is located in a discernment area 60 of the discerning person shown in FIG. 2.

Figure 3:
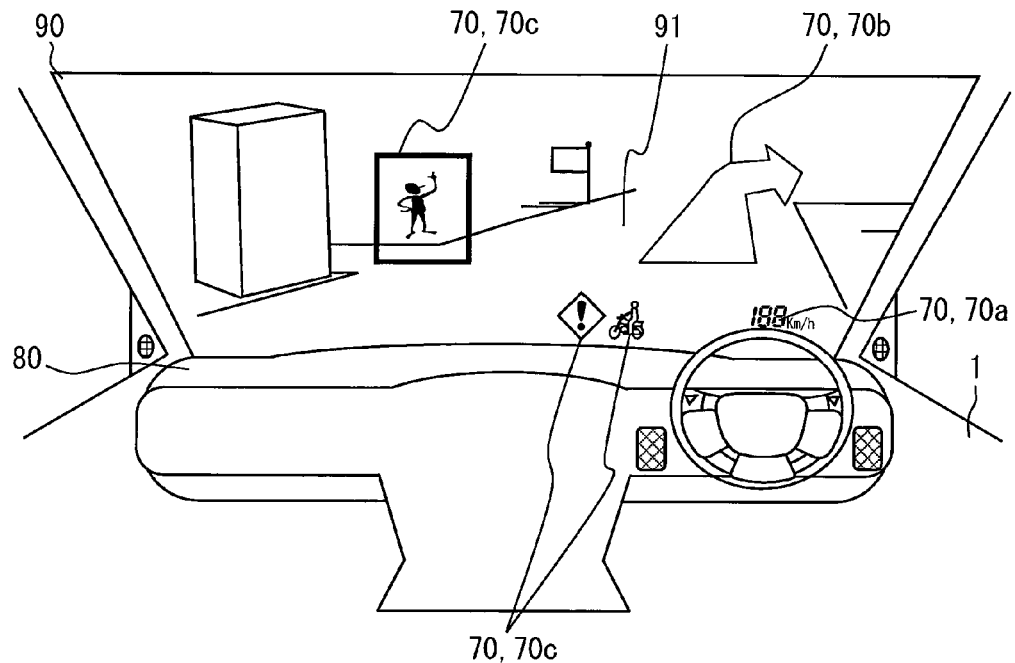
FIG. 3 is a front view showing a displaying state of the HUD device in accordance with the first embodiment.

By projecting the display image 71 onto the projection surface 91, the HUD device 100 displays, as shown in FIG. 3, the virtual image 70 of the display image 71 so that the virtual image 70 can be discerned inside the vehicle 1. As the virtual image 70, an instructive display 70a representing a traveling speed of the vehicle 1, an instructive display 70b representing an advancing direction of the vehicle 1 provided by a navigation system, or a warning display 70c concerning the vehicle 1 is displayed.

(Overall Features of HUD Device)

The overall features of the HUD device 100 will be described below. As shown in FIG. 1, the HUD device 100 has a laser scanner 10, a controller 29, a screen member 30, and an optical system 40 incorporated in a housing 50.

Figure 4:
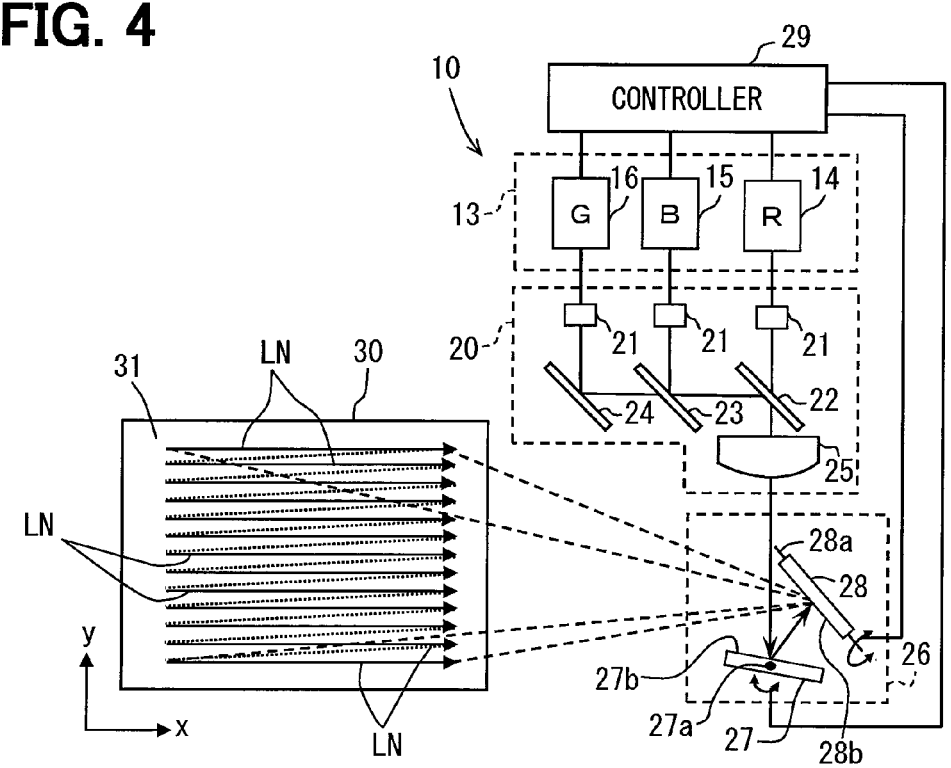
FIG. 4 is a schematic diagram showing a concrete configuration of the HUD device in accordance with the first embodiment.

As shown in FIG. 4, the laser scanner 10 serving as a projector includes a light source unit 13, a light guide unit 20, and microelectromechanical systems (MEMS) 26.

The light source unit 13 includes three laser projection parts 14, 15, and 16. The laser projection parts 14, 15, and 16 project single-wavelength laser light rays of mutually different hues in response to a control signal sent from the controller 29 to which the laser projection parts are electrically connected. Specifically, the laser projection part 14 projects, for example, red laser light whose peak wavelength falls within a range from 600 nm to 650 nm (preferably, 640 nm). The laser projection part 15 projects, for example, blue laser light whose peak wavelength falls within a range from 430 nm to 470 nm (preferably, 450 nm). The laser projection part 16 projects, for example, green laser light whose peak wavelength falls within a range from 490 nm to 530 nm (preferably, 515 nm). The laser light rays of three colors projected from the laser projection parts 14, 15, and 16 respectively are added up and mixed, whereby various colors can be reproduced.

The light guide unit 20 includes three collimator lenses 21, dichroic filters 22, 23, and 24, and a condenser lens 25. The collimator lenses 21 are disposed at a distance of, for example, 0.5 mm from the associated laser projection parts 14, 15, and 16 respectively on the laser light projection sides of the laser projection parts. The collimator lenses 21 refract laser light rays emanating from the associated laser projection parts 14, 15, and 16 respectively, and thus collimate the laser light rays into parallel light rays.

The dichroic filters 22, 23, and 24 are disposed at a distance of, for example, 4 mm from the associated collimator lenses 21 on the projection sides of the laser projection parts 14, 15, and 16 respectively. The dichroic filters 22, 23, and 24 reflect laser light rays of a specific wavelength out of the laser light rays having transmitted by the associated collimator lenses 21, and transmit laser light rays of the other wavelengths. More particularly, the dichroic filter 22 disposed on the projection side of the laser projection part 14 transmits red laser light and reflects laser light rays of the other colors. The dichroic filter 23 disposed on the projection side of the laser projection part 15 reflects blue laser light and transmits laser light rays of the other colors. The dichroic filter 24 disposed on the projection side of the laser projection part 16 reflects green laser light and transmits laser light rays of the other colors.

On the green laser light reflection side of the dichroic filter 24, the dichroic filter 23 is disposed at a distance of, for example, 6 mm. On the blue laser light reflection side and green laser light transmission side of the dichroic filter 23, the dichroic filter 22 is disposed at a distance of, for example, 6 mm. Further, on the red laser light transmission side and blue laser light and green laser light reflection side of the dichroic filter 22, the condenser lens 25 is disposed at a distance of, for example, 4 mm. Owing to the layout, red laser light transmitted by the dichroic filter 22 and blue laser light and green laser light reflected from the dichroic filer 22 after reflected from the dichroic filters 23 and 24 respectively are mixed when being fed to the condenser lens 25.

The condenser lens 25 is a plano-convex lens having a planar incidence surface and convex emission surface. The condenser lens 25 concentrates laser light incident on the incidence surface through refraction. As a result, the laser light transmitted by the condenser lens 25 is emitted to the MEMS 26.

The MEMS 26 include a horizontal scanning mirror 27, vertical scanning mirror 28, and drive parts (not shown) for the scanning mirror 27 and 28 respectively. On a surface of the horizontal scanning mirror 27 whose center is opposed to the condenser lens 25 at a distance of, for example, 5 mm, a thin film-like reflection surface 27b is formed through metal deposition or the like of aluminum. On a surface of the vertical scanning mirror 28 whose center is opposed to the horizontal scanning mirror 27 at a distance of, for example, 1 mm, a thin film-like reflection surface 28b is formed through metal deposition or the like of aluminum. The drive parts included in the MEMS 26 drive the respective scanning mirrors 27 and 28 in response to a control signal sent from the controller 29 to which the MEMS are electrically connected so that the respective scanning mirrors can be turned about axes of rotation 27a and 28a respectively.

The center of the vertical scanning mirror 28 serving as the last stage of the laser scanner 10 is disposed at a distance of, for example, 100 mm from the scanning surface 31 of the screen member 30. Owing to the layout, laser light rays sequentially entering the scanning mirrors 27 and 28 after emanating from the condenser lens 25 are sequentially reflected from the reflection surfaces 27b and 28b, and then projected onto the scanning surface 31.

Figure 2:
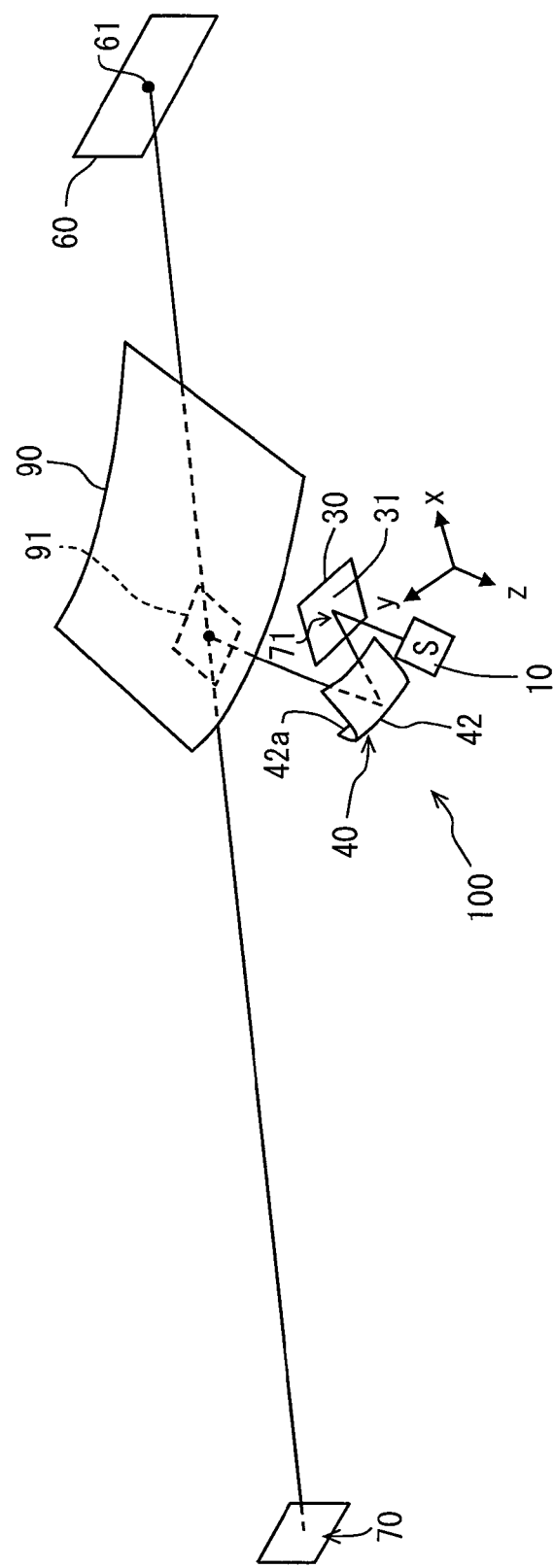
FIG. 2 is a perspective diagram showing an outline configuration of the HUD device in accordance with the first embodiment.
Figure 5:
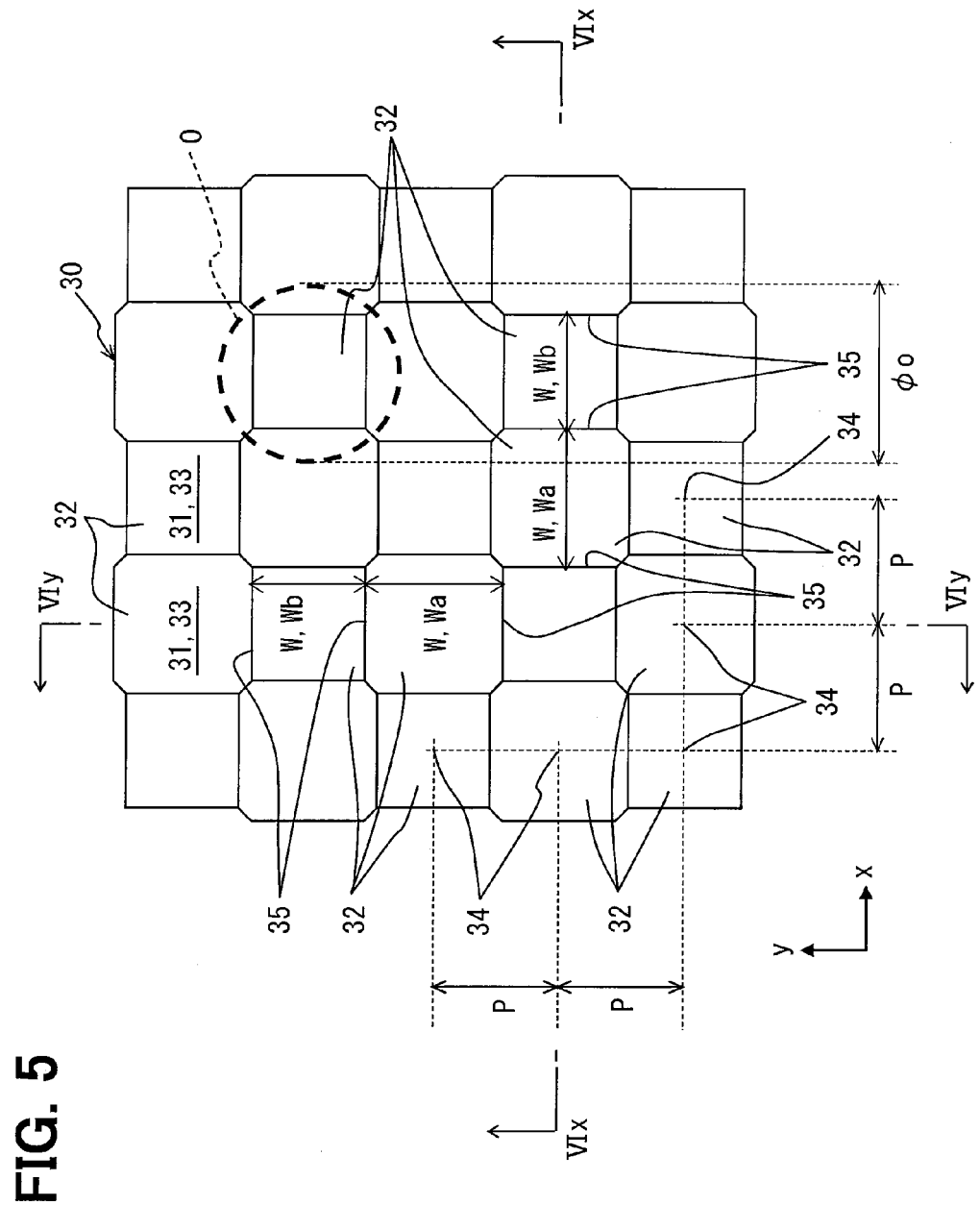
FIG. 5 is a plan view partly showing a screen member included in the first embodiment.

The controller 29 is a control circuit including a processor and others. The controller 29 outputs a control signal to the laser projection parts 14, 15, and 16, whereby laser light is intermittently pulsated and projected. In addition, the controller 29 outputs a control signal to the drive parts of the scanning mirrors 27 and 28 respectively, whereby a projecting direction of laser light to be projected onto the scanning surface 31 is changed into arrow directions in FIG. 4 along a plurality of scanning lines LN. Owing to this control, an area O onto which laser light is, as shown in FIG. 5, projected in the form of a circular spot is shifted on the scanning surface 31. Thus, the display image 71 is rendered. Specifically, laser light to be projected from the laser scanner 10 sweeps the scanning surface 31 in a horizontal direction x and vertical direction y to provide the display image 71. Herein, the display image 71 is, for example, formed on the scanning surface 31 as an image, which has 480 pixels in the horizontal direction x and 240 pixels in the vertical direction y, at 60 frames per sec. As shown in FIG. 2, the horizontal direction x of the scanning surface 31 is consistent with the horizontal direction of the vehicle 1. The vertical direction y of the scanning surface 31 may be tilted, as shown in FIG. 2, with respect to the vertical direction of the vehicle 1 or may be consistent with the vertical direction.

Figure 6:
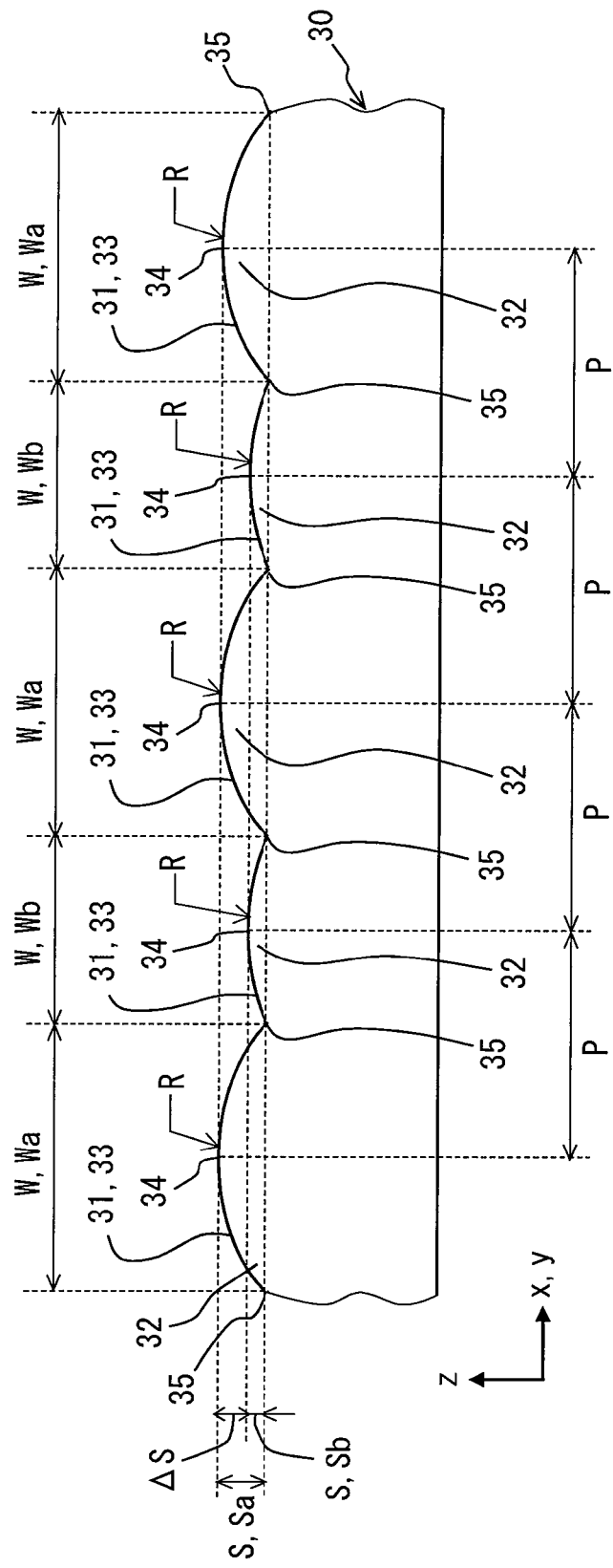
FIG. 6 is a schematic diagram partly showing the screen member included in the first embodiment and showing a section along a VIx-VIx line or VIy-VIy line in FIG. 5.

As shown in FIGS. 5 and 6, the reflective screen member 30 is formed by depositing aluminum on the surface of a resin substrate or glass substrate. The screen member 30 is disposed above the laser scanner 10 in the vehicle 1 (see FIGS. 1 and 2). The screen member 30 has a plurality of optical elements 32, which serve as micro-mirrors, arrayed in a horizontal direction x and vertical direction y in the form of a grating. The scanning surface 31 is formed with the faces of the optical elements 32 (more particularly, curved surfaces 33 to be described later). The faces of the optical elements 32 reflect laser light projected onto the scanning surface 31 so as to diffuse and emit the laser light. As shown in FIG. 5, the diameter ϕo of the projection area O on the scanning surface 31 onto which laser light is projected is set to a half-value width or more of an element width W of the optical elements 32 (preferably, a small element width Wb to be described later). The optical elements 32 may be, as shown in FIG. 6, formed as an united object or may be formed mutually separately and retained in a common substrate.

As shown in FIGS. 1 and 2, the optical system 40 includes a concave mirror 42 and a drive part for the concave mirror (not shown). The concave mirror 42 is formed by depositing aluminum on the surface of a resin substrate or glass substrate. The concave mirror 42 reflects laser light, which is diffused by the scanning surface 31, from a reflection surface 42a, and thus introduces the laser light into the projection surface 91 so as to project the display image 71. The reflection surface 42a is formed to be smoothly curved as a concave surface whose center is dented in a direction receding from the scanning surface 31 and projection surface 91, whereby the reflection surface 42a can enlarge and project the display image 71.

The drive part of the optical system 40 drives the concave mirror 42 in response to a control signal sent from the controller 29, to which the drive part is electrically connected, so that the concave mirror 42 can sway about an axis of sway 42b shown in FIG. 1. Owing to the sway, the discernment area 60 moves up and down along with the ups and downs of the position of image formation of the virtual image 70 of the projected display image 71. The position of the discernment area 60 is defined in consideration of an eyellipse 62. What is referred to as the eyellipse 62 is a spatial area inside the vehicle 1 in which the eye point 61 can exist on the assumption that an arbitrary discerning person is seated on a driver seat. The discernment area 60 that moves up and down along with the sway of the concave mirror 42 is supposed to at least partly enter the eyellipse 62 within the range of the sway.

As for the optical system 40, any optical element other than the concave mirror 42 may be substituted for the concave mirror 42 or may be additionally included. Alternatively, the optical system 40 (concave mirror 42) may be excluded, and laser light diffused by the optical elements 32 may be directly projected onto the projection surface 91.

(Detailed Feature of Optical Elements)

Next, the detailed feature of the optical elements 32 employed in the first embodiment will be described below.

As shown in FIGS. 5 and 6, the faces of the optical elements 32 take on as a common curved form a convexly curved form to be convexly curved, and thus form curved surfaces 33 such as arc surfaces. The curved surfaces 33 of the faces of the optical elements jut out to be opposed to the laser scanner 10 and optical system 40 in a direction z (see also FIG. 2) orthogonal to the directions x and y, and have the highest jutting points as surface vertices 34. The curved surfaces 33 of the faces of the optical elements 32 are formed on the scanning surface 31 of the screen member 30 on a side of the screen member 30, on which the screen member 30 is opposed to the laser scanner 10 and optical system 40, out of both the sides of the screen member 30 in a thickness direction (namely, direction z). Owing to the structure, laser light to be projected from the laser scanner 10 onto the scanning surface 31 is reflected from the curved surfaces 33 of the faces of the optical elements 32, and thus diffused and emitted from the curved surfaces 33 toward the optical system 40.

The optical elements 32 adjoining in each of the directions x and y have margins (contours) of their curved surfaces 33 layered one another, whereby boundaries 35 are formed among the optical elements. As for the curved surface 33 of the face of each of the optical elements 32 included in the first embodiment, a depth, that is, a gap quantity from each of the surface vertices 34, which serve as a reference in the direction z, to each of the boundaries (inflection point on a longitudinal section) 35 is defined as a sag quantity S. In FIG. 5, for a better understanding, only part of reference sings is shown.

The present inventors have conducted profound studies on the screen member 30 that diffuses and emits laser light using the optical elements 32. As a result, the present inventors have gotten such findings that when laser light rays emitted from the curved surfaces 33 of the faces of adjoining optical elements 32 interfere with each other, diffracted light exhibiting an intensity distribution that has plural orders of diffraction peaks associated with emission angles is generated, and a luminance variance is derived from the multiple diffraction.

Figure 7:
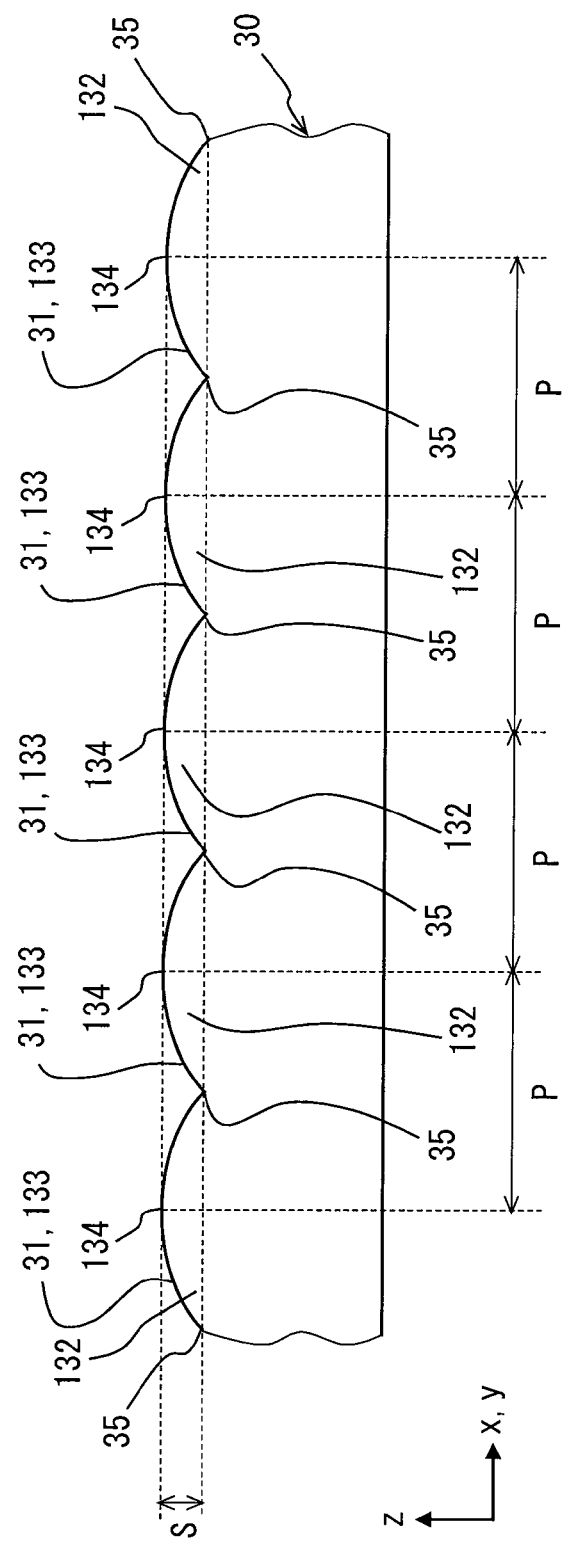
FIG. 7 is a schematic diagram partly showing a screen member included in a comparative example and being equivalent to FIG. 6.
Figure 8:
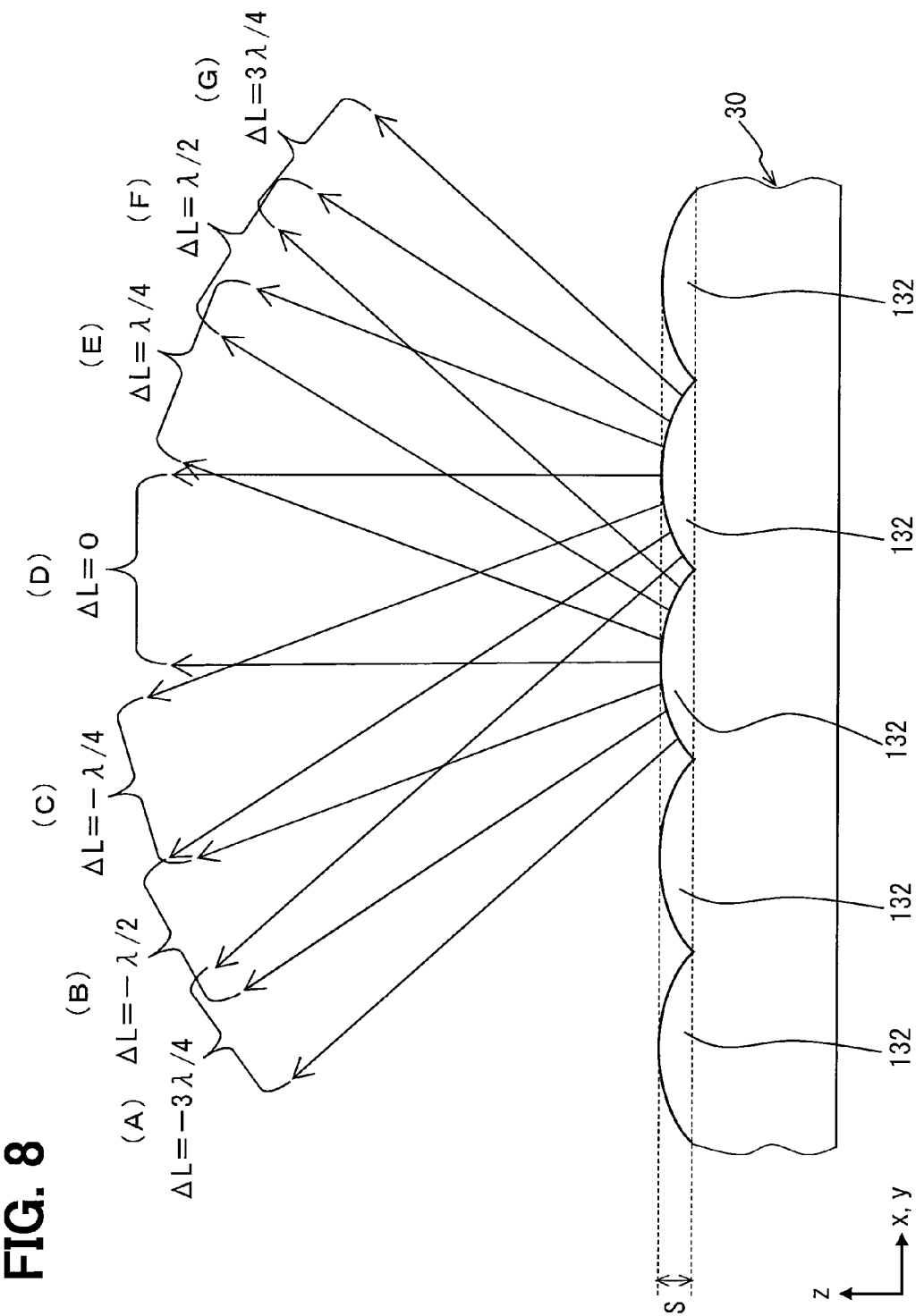
FIG. 8 is a schematic diagram for explaining an optical path difference of emitted light rays in the comparative example.

More particularly, in a comparative example having a structure conformable to the structure of the HUD device in patent literature 1, as shown in FIG. 7, a sag quantity S is set to an equal value between adjoining optical elements 132. In the comparative example, an optical path difference $\Delta L$ between laser light rays that interfere with each other after being emitted at emission angles $\theta$ from curved surfaces 133 of the faces of adjoining optical elements 132 (in the comparative example, $\theta$ in FIG. 9 as a reflection angle) is produced as shown in, for example, FIG. 8. Herein, assuming that a distance between surface vertices 134 of adjoining optical elements 132 is defined as a peak pitch P (see FIG. 7), the optical path difference $\Delta L$ is expressed as a formula (1) below under a condition that sine approximates to $\theta$ [rad]. Assuming that $\lambda$ denotes the wavelength of laser light, an angle difference $\alpha$ in the emission angle $\theta$ which causes the optical path difference $\Delta L$ to change by the wavelength $\lambda$, that is, the angle difference $\alpha$ in the emission angle $\theta$ which causes the order of a diffraction peak to change by 1 is expressed as a formula (2) below, which employs the peak pitch P, under a condition that $\sin \alpha$ approximates to $\alpha$.

$$\Delta L = P \cdot \theta \quad (1)$$

$$\alpha = \lambda/P \quad (2)$$

Figure 9:
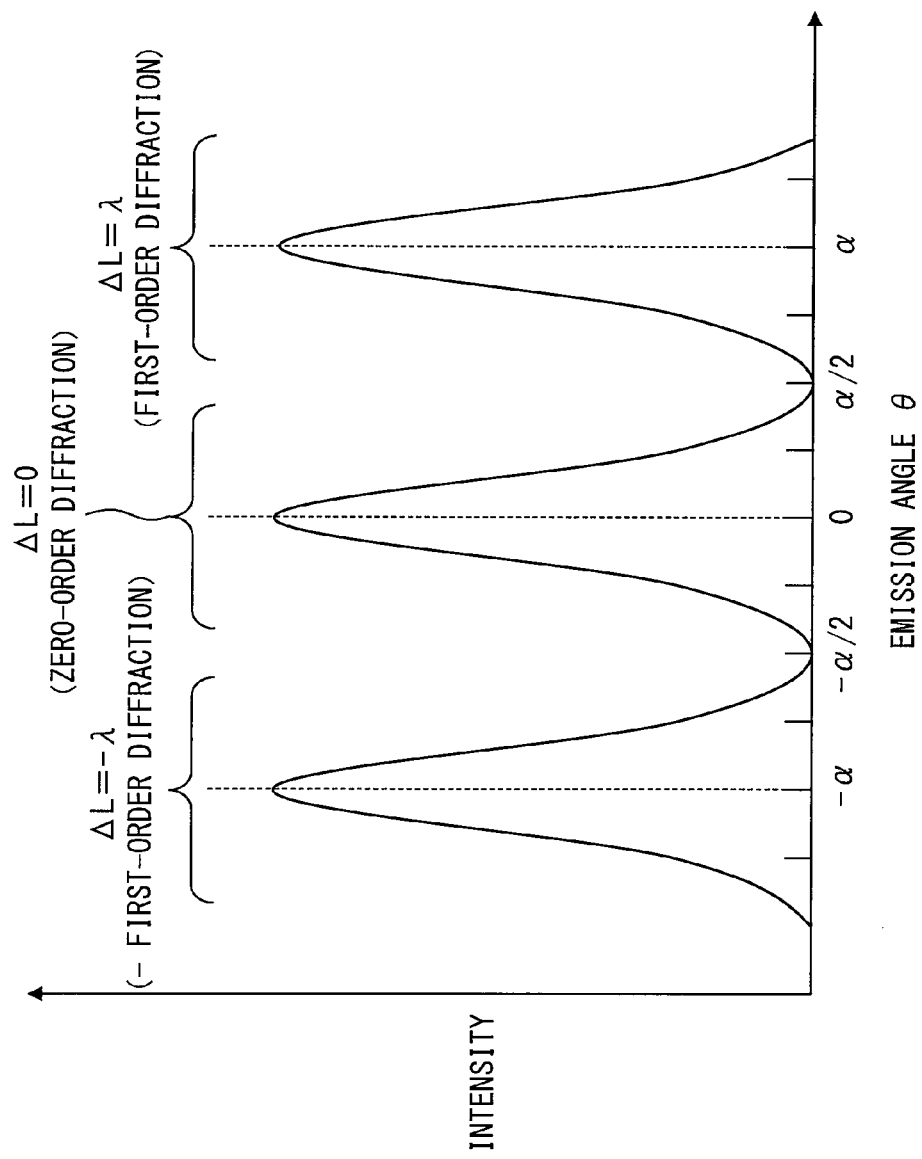
FIG. 9 is a characteristic diagram for explaining an intensity distribution of diffracted light in the comparative example.

Thinking of an intensity distribution, which is observed when the optical path difference $\Delta L$ in the comparative example is 0 or $\pm\lambda$, that is, when the order of a diffraction peak is 0 or $\pm 1$, on the basis of the formulae (1) and (2), the intensity distribution is, as seen from FIG. 9, dependent on the angle difference $\alpha$ in the emission angle $\theta$. According to the intensity distribution, since diffraction peaks caused by one optical element 132 and adjoining elements 132 on both sides of the optical element are centered on emission angles $\theta$ which begin with 0 and varies in units of $\pm\alpha$, the diffraction peaks caused by the one optical element and one of the adjoining elements are superposed on the diffraction peaks caused by the one optical element and the other adjoining element, and mutually increase their intensities. Further, since diffraction valleys caused by one optical element 132 and adjoining elements 132 on both sides of the optical element are centered on emission angles $\theta$ which begin with $\alpha/2$ and varies in units of $\alpha$ or begin with $-\alpha/2$ and varies in units of $-\alpha$, even if the diffraction valleys caused by the one optical element and one of the adjoining elements are superposed on the diffraction valleys caused by the one optical element and the other adjoining element, the diffraction valleys hardly increase their intensities.

Figure 10:
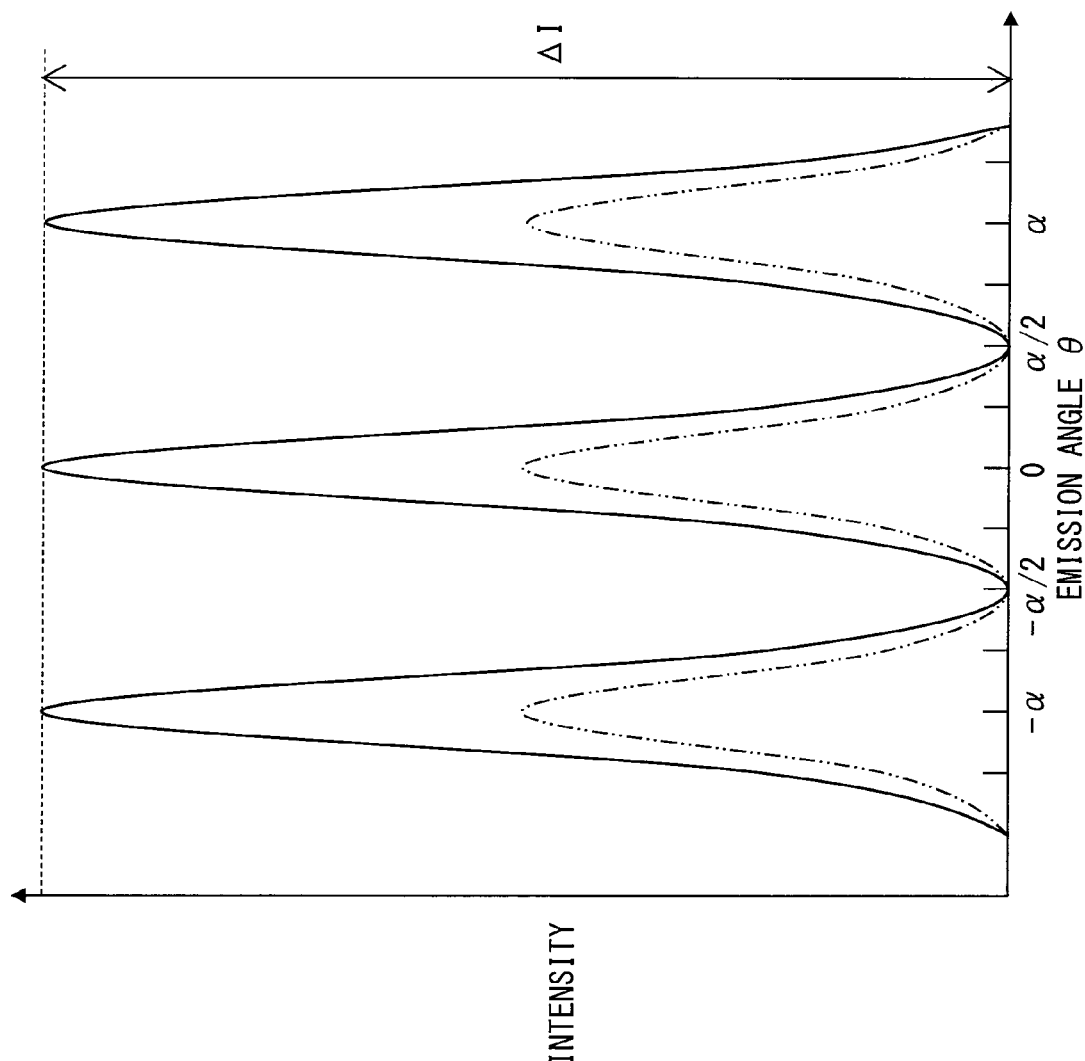
FIG. 10 is a characteristic diagram for explaining superposition of diffracted light rays on each other in the comparative example.

Accordingly, as for an intensity distribution (solid line in a graph) shown in FIG. 10 and having diffracted light rays (alternate long and two short dashes line in the graph), which are induced by one optical element 132 and adjoining elements 132 on both sides of the optical element, superposed on each other, an intensity difference $\Delta I$ is large between each of emission angles $\theta$ (begin with 0 and vary in units of $\pm\alpha$) on which diffraction peaks are centered, and each of emission angles $\theta$ (begin with $\alpha/2$ and vary in units of $\alpha$ or begin with $-\alpha/2$ and vary in units of $-\alpha$) on which diffraction valleys are centered. Therefore, a discerning person who discerns the diffracted light rays as the virtual image 70 perceives a luminance variance due to the large intensity difference $\Delta I$.

In the first embodiment, as shown in FIG. 6, the sag quantity S that differs between adjoining optical elements 32 is designated over the entire scanning surface 31. In particular, as the sag quantity S in the first embodiment, two large and small sag quantities Sa and Sb are designated. Optical elements 32 having the large sag quantity Sa and optical elements 32 having the small sag quantity Sb are alternately arrayed in both of the directions x and y. Owing to the arrayed form, adjoining optical elements 32 form a step in the direction z according to a difference (Sa−Sb) between the sag quantities Sa and Sb.

Figure 11:
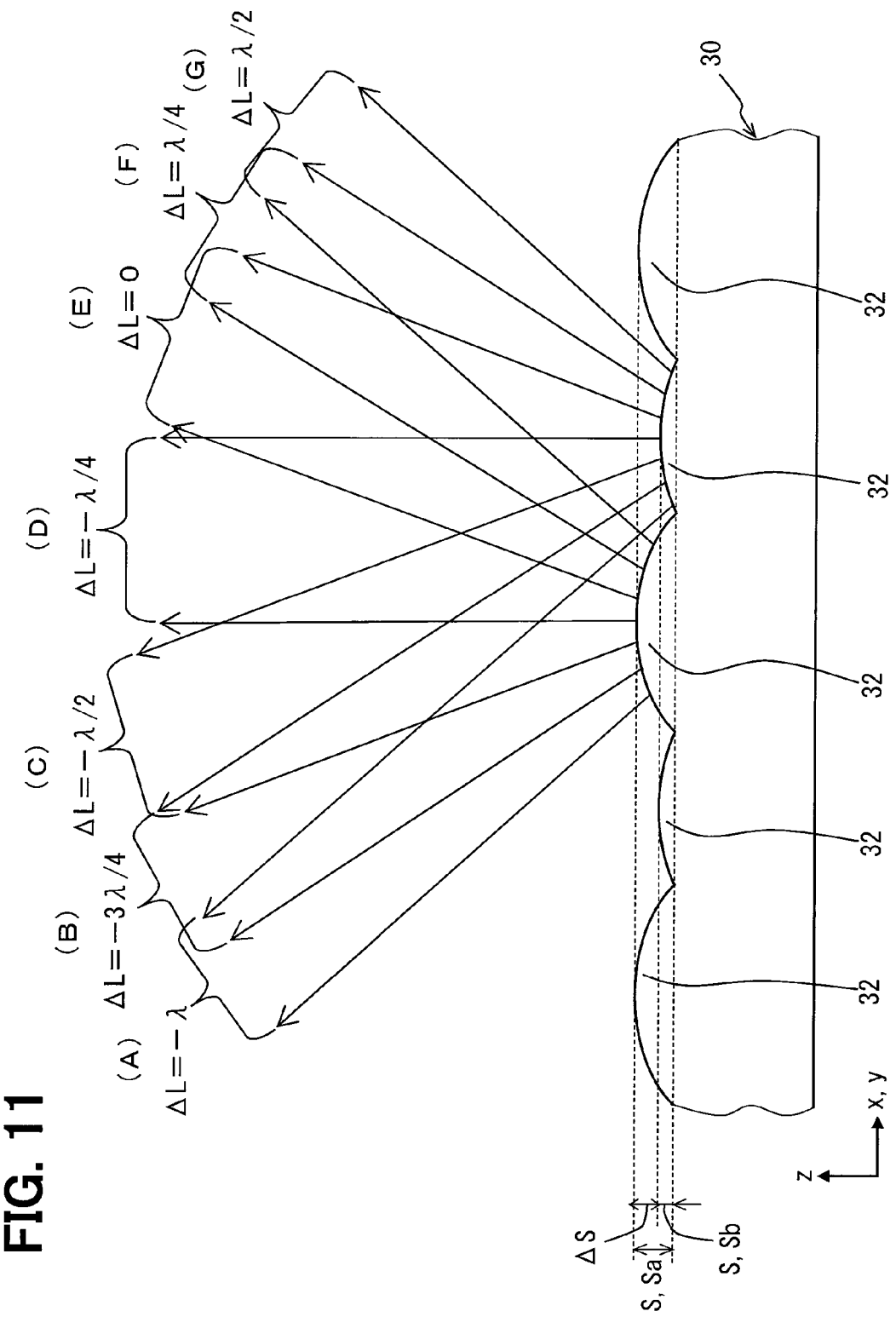
FIG. 11 is a schematic diagram for explaining an optical path difference of emitted light rays in the first embodiment.

In the first embodiment, an optical path difference $\Delta L$ between laser light rays that are emitted at emission angles $\theta$ ($\theta$ in FIG. 12 as a reflection angle in the first embodiment) from the curved surfaces 33 of the faces of adjoining optical elements 32 and interfere with each other is produced as shown in, for example, FIG. 11. Herein, assuming that $\Delta S$ denotes a difference between sag quantities Sa and Sb of the adjoining elements 32, the optical path difference $\Delta L$ is expressed as a formula (3) or (4) below using a peak pitch P (see FIGS. 5 and 6), which is larger than $\Delta S$, under a condition that sine approximates to $\theta$ [rad]. More particularly, the formula (3) is established between one optical element 32 having the large sag quantity Sa and an adjoining optical element having the small sag quantity Sb on one side (for example, right side in FIG. 6) of the optical element. The formula (4) is established between the one optical element 32 having the large sag quantity Sa and an adjoining optical element 32 having the small sag quantity Sb on the opposite side (for example, the left side in FIG. 6). An angle difference $\alpha$ in the emission angle $\theta$ which causes the optical path difference $\Delta L$ to change by a wavelength $\lambda$, that is, an angle difference $\alpha$ in the emission angle $\theta$ which causes the order of a diffraction peak, which is derived from interference between laser light rays, to change by one is expressed as a formula (5) below, which employs the peak pitch P, similarly to that in the comparative example.

$$\Delta L = P \cdot \theta - 2 \cdot \Delta S \quad (3)$$

$$\Delta L = P \cdot \theta + 2 \cdot \Delta S \quad (4)$$

$$\alpha = \lambda/P \quad (5)$$

Figure 12:
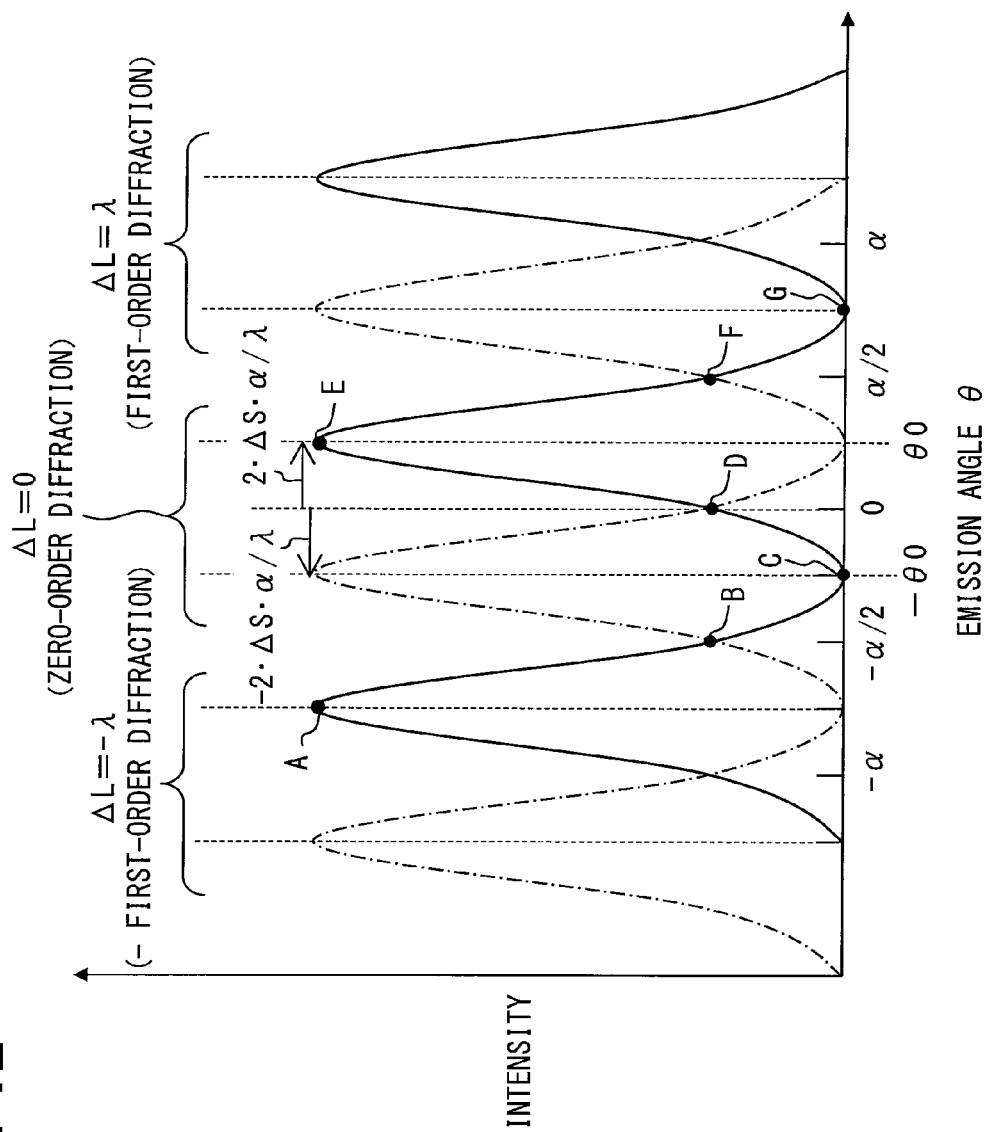
FIG. 12 is a characteristic diagram for explaining an intensity distribution of diffracted light in the first embodiment.

Thinking of an intensity distribution, which is observed when the optical path difference ΔL in the first embodiment becomes 0 or ±λ, that is, the order of a diffraction peak becomes 0 or ±1, on the basis of the formulae (3), (4), and (5), the intensity distribution is, as seen from FIG. 12, dependent on the angle difference α in the emission angle θ. According to the intensity distribution, based on the formulae (3) and (5), diffraction peaks induced by one optical element 32, which has the large sag quantity Sa, and an adjoining element 32 on one side of the optical element, which has the small sag quantity Sb, are centered on the emission angles θ that begin with a zero-order diffraction angle θ0, which is deviated from 0 by 2·ΔS·α/λ, and vary in units of ±α (solid line in the graph). Based on the formulae (4) and (5), diffraction peaks induced by the one optical element 32, which has the large sag quantity Sa, and an adjoining element 32 on the opposite side, which has the small sag quantity Sb, are centered on the emission angles θ that begin with a zero-order diffraction angle −θ0, which is deviated from 0 by −2·ΔS·α/λ, and vary in units of ±α (dot-dash line in the graph). FIG. 12 shows an example in which the diffraction peaks occur at the emission angles, which begin with θ0=α/4 or −θ0=−α/4 and vary in units of ±α, because of designation of ΔS=λ/8. Points A to G marked on the solid line in the graph of FIG. 12 correspond to directions A to G of diffracted light rays which produce optical path differences ΔL shown in FIG. 11.

In the first embodiment, diffraction peaks of diffracted light induced by one optical element 32 and an adjoining element 32 on one side of the optical element and diffraction peaks of diffracted light induced by the one optical element 32 and an adjoining element 32 on the other side of the optical element are centered on different emission angles θ and are therefore deviated from each other. As a result of the deviation effect, diffraction peaks caused by one optical element 32 and either of adjoining elements 32 are superposed on diffraction valleys caused by the one optical element and the other adjoining element 32. Therefore, intensities are hardly increased.

Figure 13:
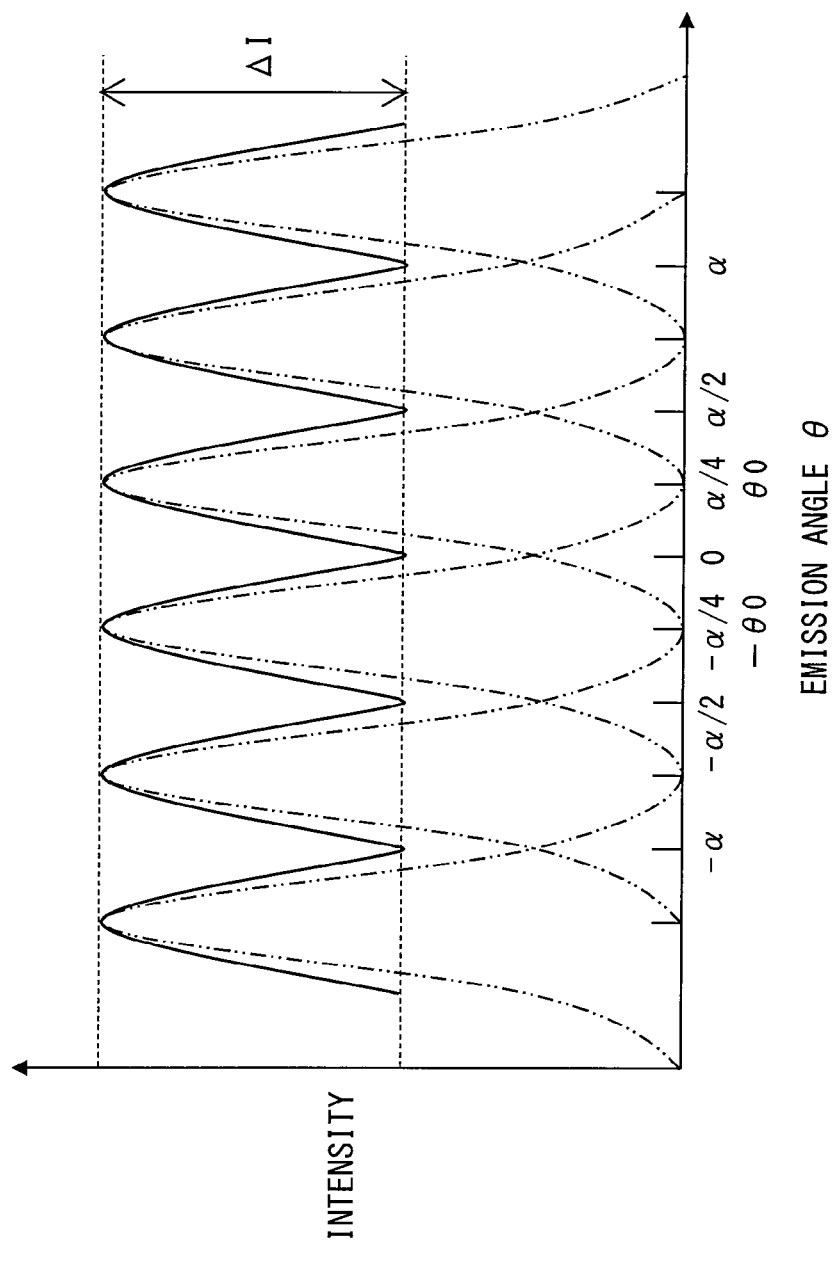
FIG. 13 is a characteristic diagram for explaining superposition of diffracted light rays on each other in the first embodiment.

As mentioned above, according to an intensity distribution (solid line in a graph) which is shown in FIG. 13 and observed by superposing diffracted light rays (alternate long and two short dashes line in the graph), which are induced by one optical element 32 and adjoining elements 32 on both sides of the optical element, on each other, an intensity difference ΔI is small between each of emission angles θ (which begin with θ0 or −θ0 and vary in units of ±α) on which diffraction peaks are centered, and each of intermediate emission angles θ. For example, when ΔS=λ/8 is, similarly to FIG. 12, designated in FIG. 13, the intensity difference ΔI can be diminished between each of emission angles θ, which begin with α/4 or −α/4 and vary in units of ±α, and each of emission angles θ which begin with 0 and vary in units of ±α/2. Therefore, a luminance variance which a discerning person perceives can be suppressed according to the small intensity difference ΔI.

Figure 14:
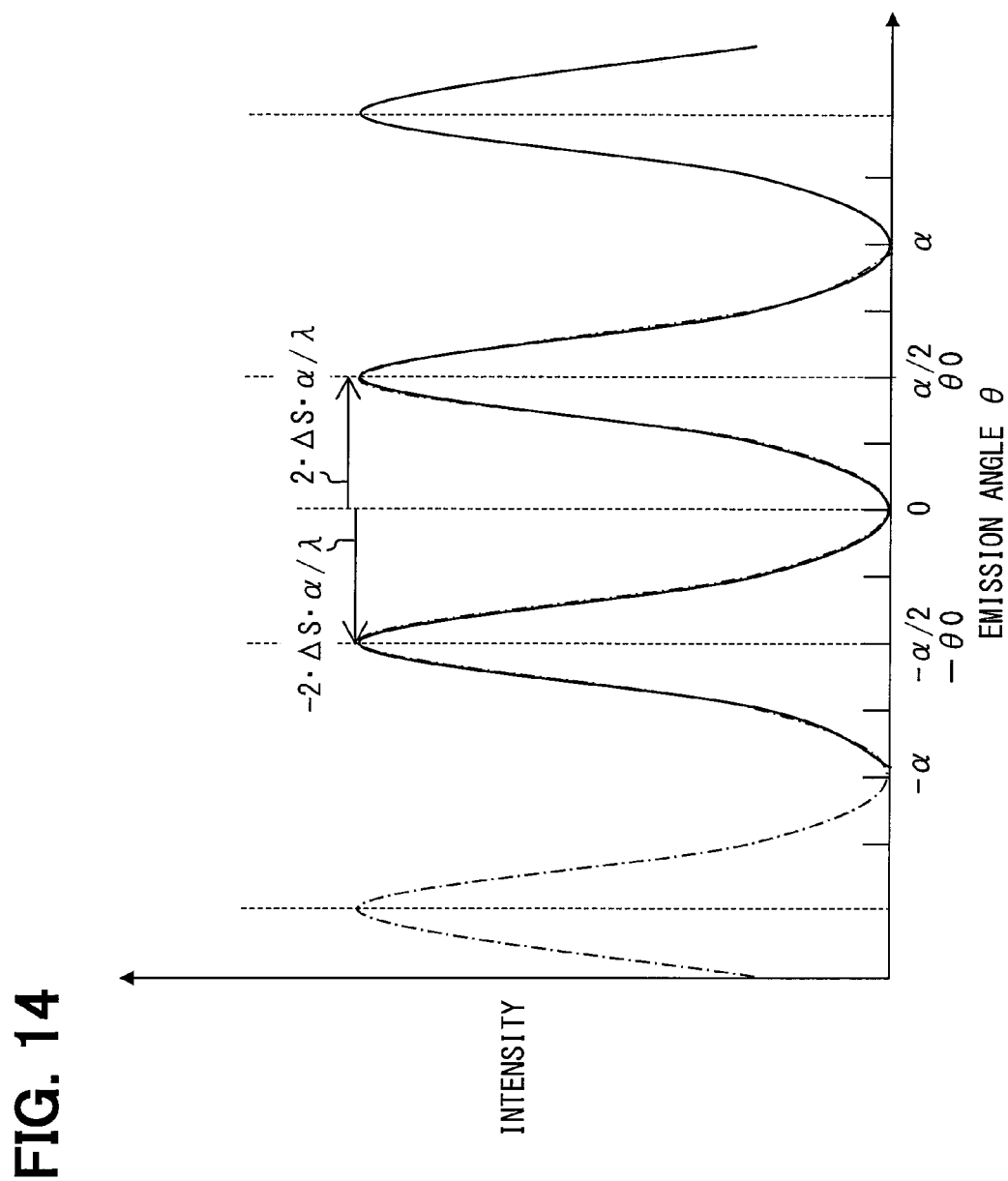
FIG. 14 is a characteristic diagram for explaining designation of a sag quantity difference in the first embodiment.

As described so far, the first embodiment adopts a structure in which the optical elements 32 reflect laser light from the curved surfaces 33 so as to diffuse and emit the laser light. In the structure, assuming that m denotes an arbitrary odd number equal to or larger than 1, if a difference ΔS between the sag quantities of adjoining optical elements 32 is consistent with m·λ/4, there arises a fear that diffraction peaks caused by one optical element 32 and an adjoining element 32 on one of the sides of the optical element may, as shown in FIG. 14, be superposed on diffraction peaks caused by the one optical element 32 and an adjoining element 32 on the other side of the optical element. This is because in case ΔS=m·λ/4 is designated (in the example shown in FIG. 14, ΔS=λ/4 is designated), the diffraction peaks occur at emission angles that begin with θ0=α/2 or −θ0=−α/2 and vary in units of ±α.

In the first embodiment, therefore, the sag quantity difference ΔS between adjoining optical elements 32 is set to a value allowing a formula (6) below to be established. Further, the sag quantity difference ΔS allowing the formula (6) to be established is preferably set to a value allowing a formula (7) below to be established. Above all, the sag quantity difference ΔS is more preferably set to a value allowing a formula (8) below to be established.

$$\Delta S \neq m \cdot \lambda/4 \quad (6)$$

$$(2m-1) \cdot \lambda/16 < \Delta S < (2m+1) \cdot \lambda/16 \quad (7)$$

$$\Delta S = m \cdot \lambda/8 \quad (8)$$

In the first embodiment employing multi-color laser light, the wavelength λ in the formulae (6), (7), and (8) is supposed to be the wavelength of laser light of at least one color. For example, if the wavelength λ is supposed to be the wavelength of the laser light of one color, the peak wavelength of green laser light exhibiting high luminous efficiency or the peak wavelength of red laser light exhibiting a large diffraction angle is preferably supposedly adopted as the wavelength λ. If the wavelength λ is supposed to be the wavelength of each of laser light rays of two or more colors, m is set to a value that varies depending on the color. Accordingly, the formulae (6), (7), and (8) can be established.

When the peak wavelength of green laser light is supposedly adopted as the wavelength λ, the sag quantity difference ΔS [unit: nm] is set to a value which allows a formula (9) based on the formula (6), preferably, a formula (10) based on the formula (7), or more preferably, a formula (11) based on the formula (8) to be established.

$$\Delta S \neq 490 \cdot m/4 \text{ to } 530 \cdot m/4 \quad (9)$$

$$490 \cdot (2m-1)/16 < \Delta S < 530 \cdot (2m+1)/16 \quad (10)$$

$$\Delta S = 490 \cdot m/8 \text{ to } 530 \cdot m/8 \quad (11)$$

When the peak wavelength of red laser light is supposedly adopted as the wavelength λ, the sag quantity difference ΔS [unit: nm] is set to a value which allows a formula (12) based on the formula (6), preferably, a formula (13) based on the formula (7), or more preferably, a formula (14) based on the formula (8) to be established.

$$\Delta S \neq 600 \cdot m/4 \text{ to } 650 \cdot m/4 \quad (12)$$

$$600 \cdot (2m-1)/16 < \Delta S < 650 \cdot (2m+1)/16 \quad (13)$$

$$\Delta S = 600 \cdot m/8 \text{ to } 650 \cdot m/8 \quad (14)$$

In the first embodiment in which any of the formulae (6), (7), and (8) (including formulae (9) to (14)) is established, as far as laser light of at least one color is concerned, since the sag quantity difference ΔS between adjoining optical elements 32 is inconsistent with m·λ/4, superposition of diffraction peaks on other diffraction peaks can be avoided. In FIG. 6, for a better understanding, the sag quantity difference ΔS is shown to be larger than an actual one.

The present inventors have gotten such findings that when laser light is emitted from the boundary 35 between adjoining optical elements 32, the emitted light exhibits an intensity distribution, which undulates depending on an emission angle, due to diffraction on the boundary 35, and a luminance variance is derived from the boundary diffraction (aperture diffraction).

In the first embodiment, as shown in FIGS. 5 and 6, the optical elements 32 are formed so that an element width W between boundaries 35 on a longitudinal section, which contains the surface vertices 34, differs between adjoining optical elements 32 in both of directions x and y over the entire scanning surface 31. As the element width W in the first embodiment, two large and small element widths Wa and Wb are designated. Optical elements 32 having the large element width Wa and optical elements 32 having the small element width Wb are alternately arrayed in both of the directions x and y. Owing to the arrayed form, the optical elements have the same relationship in the value of the element width W in comparison with an adjoining optical element 32 in both of the horizontal direction x and vertical direction y.

Figure 15:
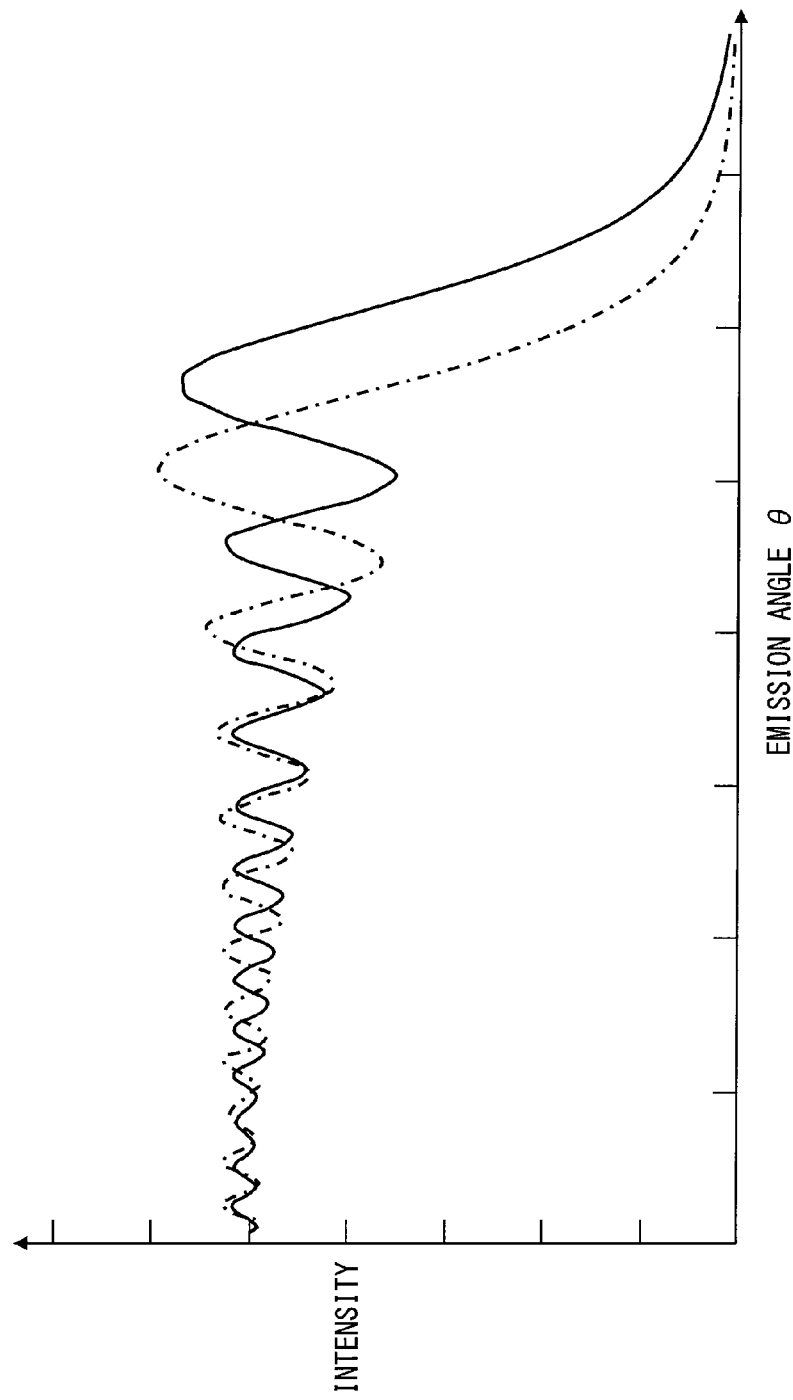
FIG. 15 is a characteristic diagram for explaining an intensity distribution of emitted light in the first embodiment.
Figure 16:
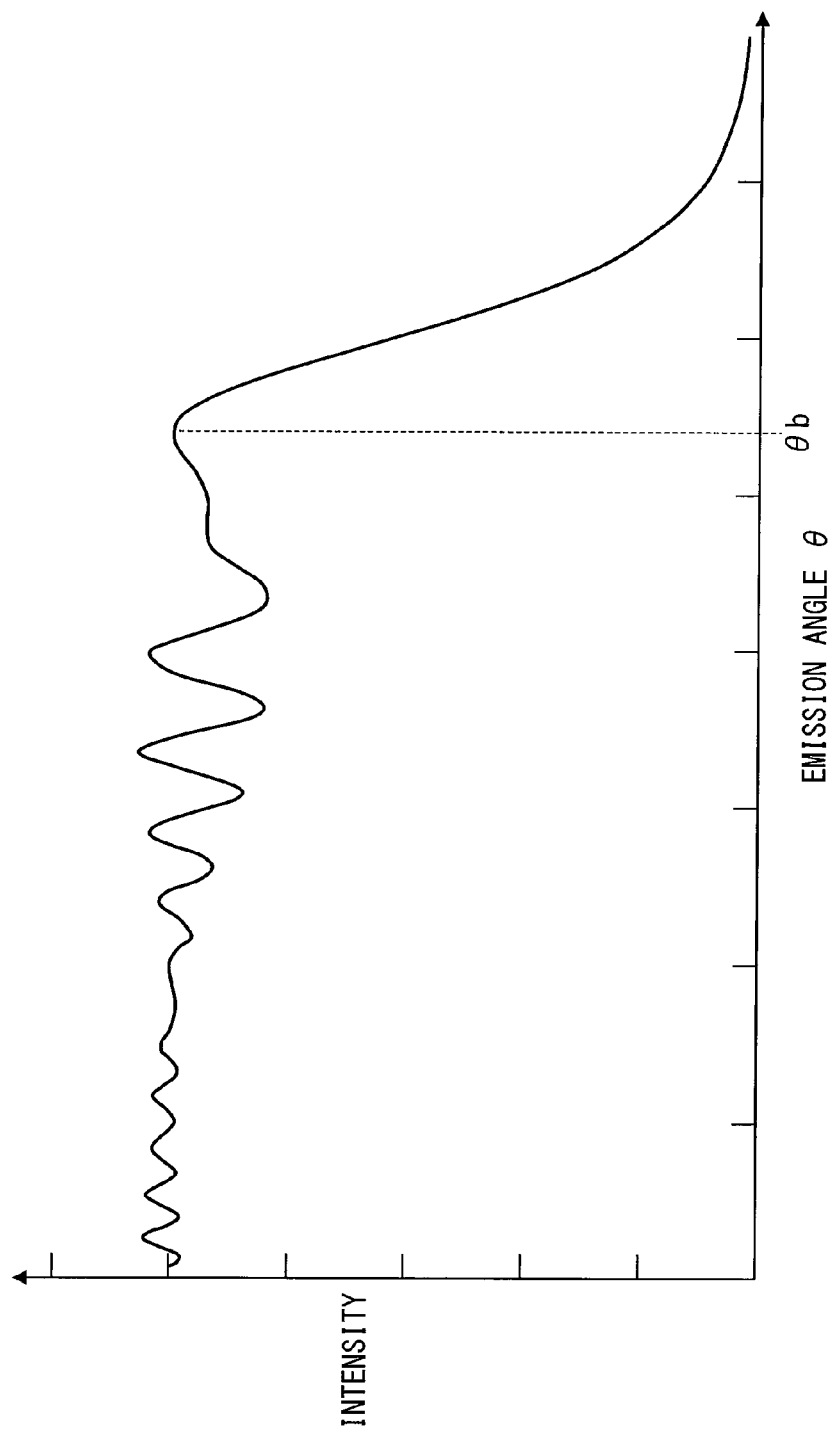
FIG. 16 is a characteristic diagram for explaining superposition of emitted light rays on each other in the first embodiment.

In the first embodiment, as shown in FIG. 15, when it comes to an undulation of an intensity distribution dependent on an emission angle θ on each of the optical elements 32, an undulation caused by optical elements 32 having the large element width Wa (solid line in a graph) and an undulation caused by optical elements 32 having the small element width Wb (dot-dash line in the graph) are deviated from each other. Accordingly, peak intensities are hardly increased. In an intensity distribution shown in FIG. 16 and observed by superposing laser light rays, which are emitted from the optical elements 31 having the element widths Wa and Wb respectively, on each other, an undulation quantity is small around an emission angle θb corresponding to the boundary 35. Therefore, a luminance variance which a discerning person perceives can be suppressed according to the undulation quantity. Herein, the profound studies made by the present inventors demonstrate that the element widths Wa and Wb are preferably set to values that fall within a range from ±3.5% to ±5% of the peak pitch P (in the present embodiment, the peak pitch squares with a mean value of the element widths Wa and Wb) in terms of suppression of the luminance variance.

In the first embodiment, in order to realize all the aforesaid features, the element width Wa is set for the optical elements 32 having the large sag quantity Sa and the element width Wb is set for the optical elements 32 having the small sag quantity Sb. The radius of curvature R that remains equal on a longitudinal section containing the surface vertices 34 is set for the curved surfaces 33 of the faces of the optical elements 32 in both of the directions x and y over the entire scanning surface 31. As shown in FIGS. 5 and 6, the peak pitch P that remains equal is set as a distance between the surface vertices 34 of adjoining optical elements 32 for the optical elements 32 in both of the directions x and y over the entire scanning surface 31. Further, a double value of the peak pitch P in both of the directions x and y is set to a value equal to the sum (Wa+Wb) of the large element width Wa and small element width Wb.

Figure 17:
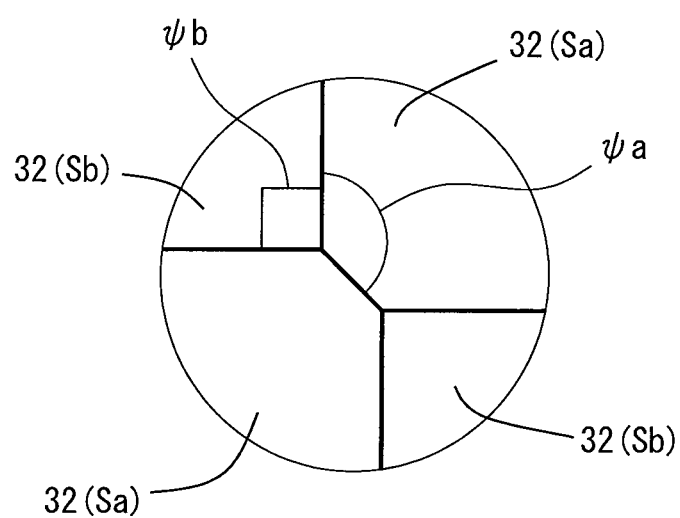
FIG. 17 is a plan view showing a pivotal part of the screen member, which is shown in FIG. 5, in enlargement.

With the foregoing settings, each of the optical elements 32 having the small sag quantity Sb has, as shown in FIG. 5, a square shape when seen in the direction z, and therefore adjoins four elements 32, which have the large sag quantity Sa, with the boundaries 35 having a linear shape and being interposed among them. Therefore, an internal angle ψb of each of the corners of the optical elements 32 having the small sag quantity Sb is, as shown in FIG. 17, 90°. Each of the optical elements 32 having the large sag quantity Sa has, as shown in FIG. 5, a substantially octagonal shape created by cutting the corners of a square shape when seen in the direction z, and not only adjoins four elements 32, which have the small sag quantity Sb, with the linear boundaries 35 interposed among them but also adjoins four other elements 32 having the large sag quantity Sa. Accordingly, an internal angle ψa of each of the corners of the optical elements 32 having the large sag quantity Sa is, as shown in FIG. 17, 135°.

(Advantageous Effects)

The advantageous effects of the aforesaid first embodiment will be described below.

In the first embodiment, the adjoining optical elements 32 emit laser light rays from the curved surfaces 33 of the faces of the optical elements which take on a common convex curved form. An intensity distribution of diffracted light derived from interference of emitted light rays has plural orders of diffraction peaks associated with emission angles. However, since the sag quantity S (Sa or Sb) from the surface vertex 34 on the curved surface 33 of an optical element 32 to the boundary 35 between adjoining optical elements 32 differs between the adjoining optical elements, diffraction peaks of diffracted light induced by one optical element 32 and one of adjoining elements 32 on both sides of the optical element are deviated from diffraction peaks induced by the optical element 32 and the other adjoining element 32. By utilizing the deviation effect, the diffraction peaks of diffracted light induced by one optical element 32 and an adjoining element 32 on one side of the optical element are superposed on diffraction valleys of diffracted light induced by the one optical element 32 and an adjoining element 32 on the opposite side. Thus, a luminance variance which a discerning person who discerns the diffracted light rays as a virtual image 70 can be suppressed.

In the first embodiment, the sag quantity S (Sa or Sb) that differs between adjoining optical elements 32 is realized over the entire scanning surface 31 on one side of the screen member 30 on which the curved surfaces 33 of the faces of the optical elements 32 are formed. Accordingly, the deviation effect of diffraction peaks can be exerted irrespective of an element position on the scanning surface 31. Eventually, a high effect of suppression of a luminance variance which a discerning person perceives can be attained.

Further, in the first embodiment, when any of the formulae (6), (7), and (8) is established, the difference ΔS between the sag quantities S (Sa and Sb) of adjoining optical elements 32 is inconsistent with m·λ/4. Accordingly, superposition of diffraction peaks on other diffraction peaks can be reliably avoided. Therefore, credibility in the effect of suppression of a luminance variance which a discerning person perceives can be upgraded.

Further, in the first embodiment, superposition of diffraction peaks on other diffraction peaks is avoided in consideration of the peak wavelength λ of green laser light, which falls within a range from 490 nm to 530 nm, out of multi-color laser light, that is, the peak wavelength λ of laser light exhibiting high luminous efficiency. Accordingly, an effect of suppression of a luminance variance which a discerning person perceives can be upgraded. Otherwise, in the first embodiment, superposition of diffraction peaks on other diffraction peaks is avoided in consideration of the peak wavelength λ of red laser light, which falls within a range from 600 nm to 650 nm, out of the multi-color laser light, that is, the peak wavelength λ of laser light exhibiting a large diffraction angle. Accordingly, the luminance variance that is more noticeable at the large diffraction angle can be suppressed.

Further, in the first embodiment, since laser light rays emitted from the boundaries 35 among adjoining optical elements 32 interfere with each other due to diffraction, an undulatory intensity distribution appears in the light rays emitted from the adjoining optical elements 32. Even in this case, the undulations of the intensity distributions are deviated from each other according to the difference in the element width W (between Wa and Wb). Accordingly, the light rays emitted from the adjoining optical elements 32 are discerned as the virtual image 70 by a discerning person with the undulations of the intensity distributions deviated from each other. Thus, an effect of further suppression of a luminance variance which the discerning person perceives can be exerted.

In addition, according to the first embodiment in which the optical elements 32 adjoin with the linear boundaries 35 interposed among them, occurrence of a loss in light incident on the eye point 61 or a ghost due to laser light diffraction on the boundaries 35 can be suppressed.

Second Embodiment

Figure 18:
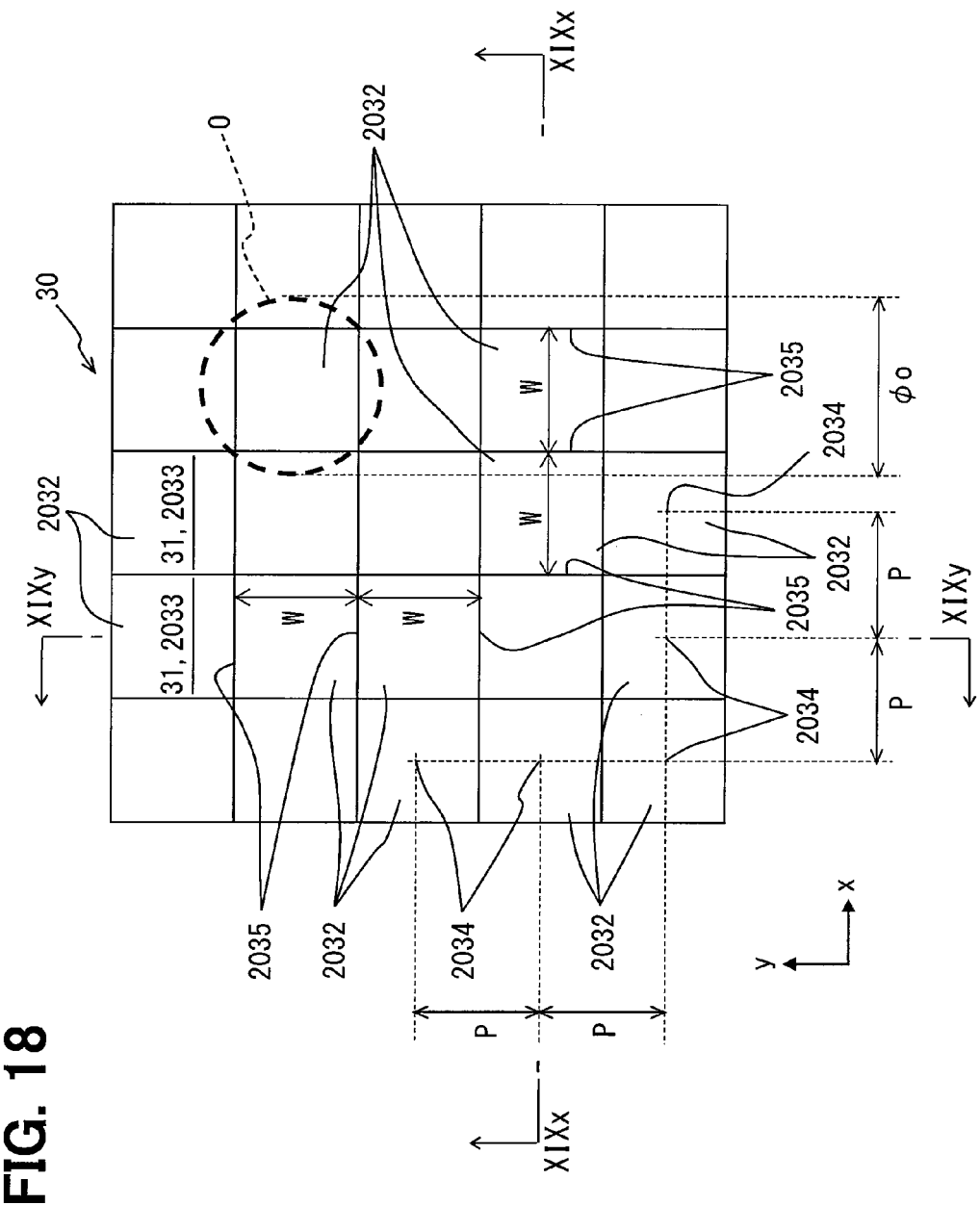
FIG. 18 is a plan view partly showing a screen member included in a second embodiment.
Figure 19:
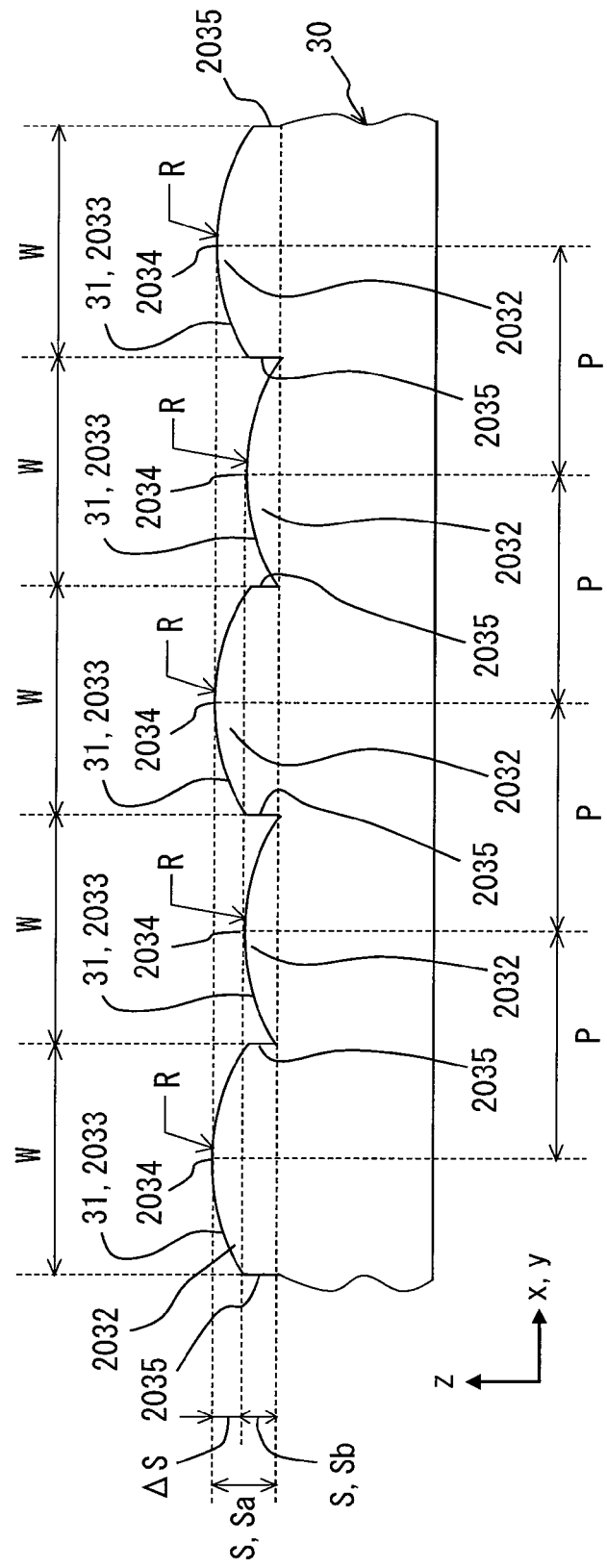
FIG. 19 is a schematic diagram partly showing the screen member included in the second embodiment and showing a section along an XIXx-XIXx line or XIXy-XIXy line in FIG. 18.

As shown in FIGS. 18 and 19, the second embodiment of the present disclosure is a variant of the first embodiment. In the second embodiment, an element width W of each of optical elements 2032 is equal in both of directions x and y over the entire scanning surface 31 and is set to the same value as a peak pitch P is. Namely, the optical elements 2032 having the uniform width W adjoin in the horizontal direction x and vertical direction y in which the peak pitch P is realized.

For the optical elements 2032 in the second embodiment, a sag quantity S that differs between adjoining elements in the same manner as that in the first embodiment, or more particularly, large and small sag quantities Sa and Sb having a difference ΔS between them are set for the entire scanning surface 31. A radius of curvature R that is held equal on a longitudinal section containing surface vertices 2034 is set for the curved surfaces 2033 of the optical elements 2032 in both of the directions x and y over the entire scanning surface 31. As for the curved surfaces 2033 of the faces of the optical elements 2032 in the second embodiment, a depth that is a gap quantity from each of the surface vertices 2034, which serve as a reference in a direction z, to each of boundaries 2035 (inflection point on the longitudinal section) is defined as the sag quantity S.

With the foregoing settings, each of optical elements 2032 having a large sag quantity Sa takes on, as shown in FIG. 18, a square shape when seen in the direction z, and adjoins four elements 2032, which have a small sag quantity Sb, with boundaries 2035, which is, as shown in FIG. 19, shaped like step surfaces, interposed among them. In addition, each of optical elements 2032 having the small sag quantity Sb takes on, as shown in FIG. 18, a square shape when seen in the direction z, and adjoins four elements 2032, which have the large sag quantity Sa, with the boundaries 2035, which is, as shown in FIG. 19, shaped like step surfaces, interposed among them.

In the second embodiments, the boundary 2035 between adjoining optical elements 2032 is shaped like a step surface, and the relative positions of the surface vertices 2034 of the adjoining optical elements 2032 are differentiated from each other. Thus, the different sag quantities S (Sa and Sb) permitting suppression of a luminance variance can be reliably ensured. In addition, the radius of curvature R of the curved surfaces 2033 and an element width W between the boundaries 2035 are held equal among all the optical elements 2032. According to the second embodiment, a variance in a range of diffusion of laser light among the optical elements 2032 can be minimized, and a loss in light incident on the eye point 61 can be suppressed.

Third Embodiment

Figure 20:
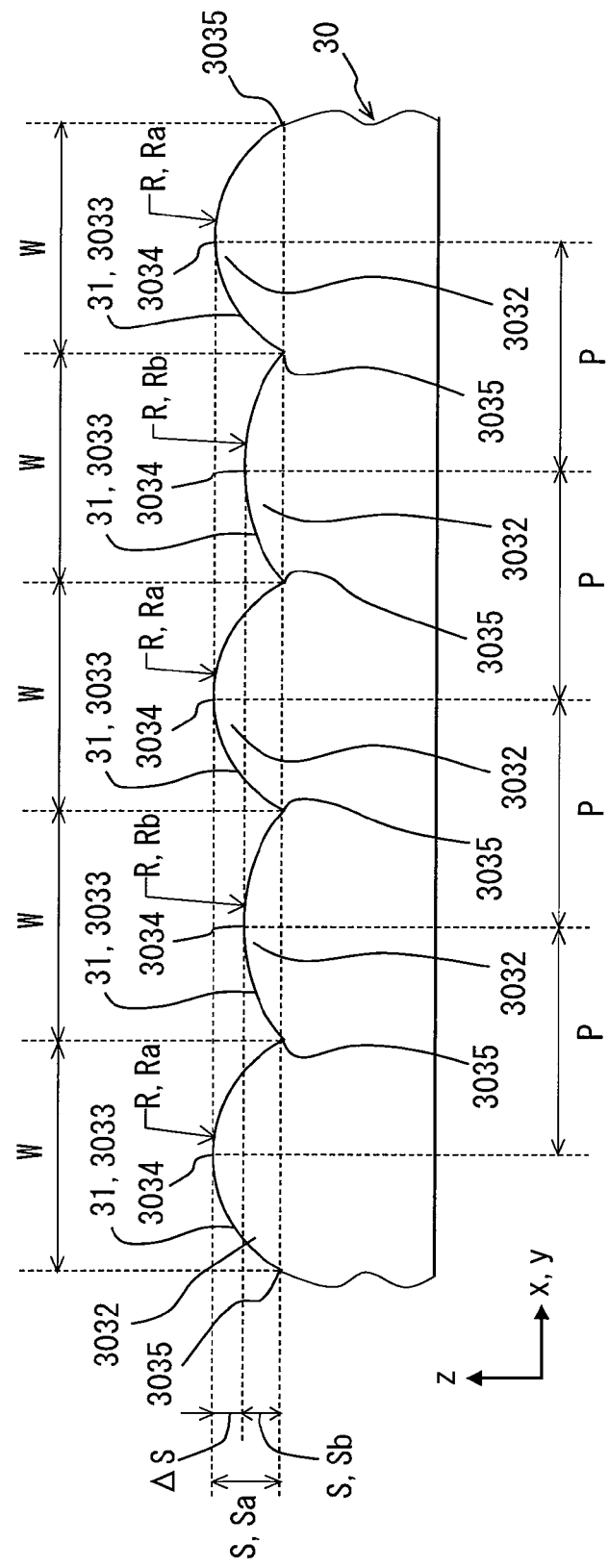
FIG. 20 is a schematic diagram partly showing a screen member included in a third embodiment and being equivalent to FIG. 19.

As shown in FIG. 20, the third embodiment of the present disclosure is a variant of the second embodiment. In the third embodiment, for optical elements 3032 that have an equal element width W which is identical to a peak pitch P and that have different sag quantities S (Sa and Sb), a radius of curvature R is designated differently from that in the second embodiment. More particularly, for curved surfaces 3033 of the optical elements 3032 on the entire scanning surface 31, the radius of curvature R on a longitudinal section, which contains surface vertices 3034, is designated to differ between adjoining elements 3032. As the radius of curvature R in the third embodiment, two large and small radii of curvatures Ra and Rb are designated. Optical elements 3032 having the small radius of curvature Ra and optical elements 3032 having the large radius of curvature Rb are alternately arrayed in both of directions x and y. Owing to the arrayed form, the optical elements 3032 have the same relationship in the value of the radius of curvature R in comparison with an adjoining optical element in both of the horizontal direction x and vertical direction y. In the third embodiment, the small radius of curvature Ra is set for the optical elements 3032 having the large sag quantity Sa, and the large radius of curvature Rb is set for the optical elements 3032 having the small sag quantity Sb.

With the foregoing settings, each of the optical elements 3032 having the large sag quantity Sa takes on a square shape (not shown) when seen in a direction z, and adjoins four elements 3032, which have the small sag quantity Sb, with linear boundaries 3035 interposed among them. Each of the optical elements 3032 having the small sag quantity Sb takes on a square shape (not shown) when seen in the direction z, and adjoins four elements 3032, which have the large sag quantity Sa, with the linear boundaries 3035 interposed among them.

In the third embodiment, since the radius of curvature R differs between adjoining optical elements 3032, and the relative positions of the surface vertices 3034 of the adjoining optical elements 3032 are differentiated from each other, the different sag quantities S (Sa and Sb) permitting suppression of a luminance variance can be reliably ensured. At the same time, the optical elements 3032 adjoin with the linear boundaries 3035 interposed among them. According to the third embodiment, occurrence of a loss in light incident on the eye point 61 or a ghost due to diffraction of laser light on the boundaries 3035 can be suppressed.

Fourth Embodiment

Figure 21:
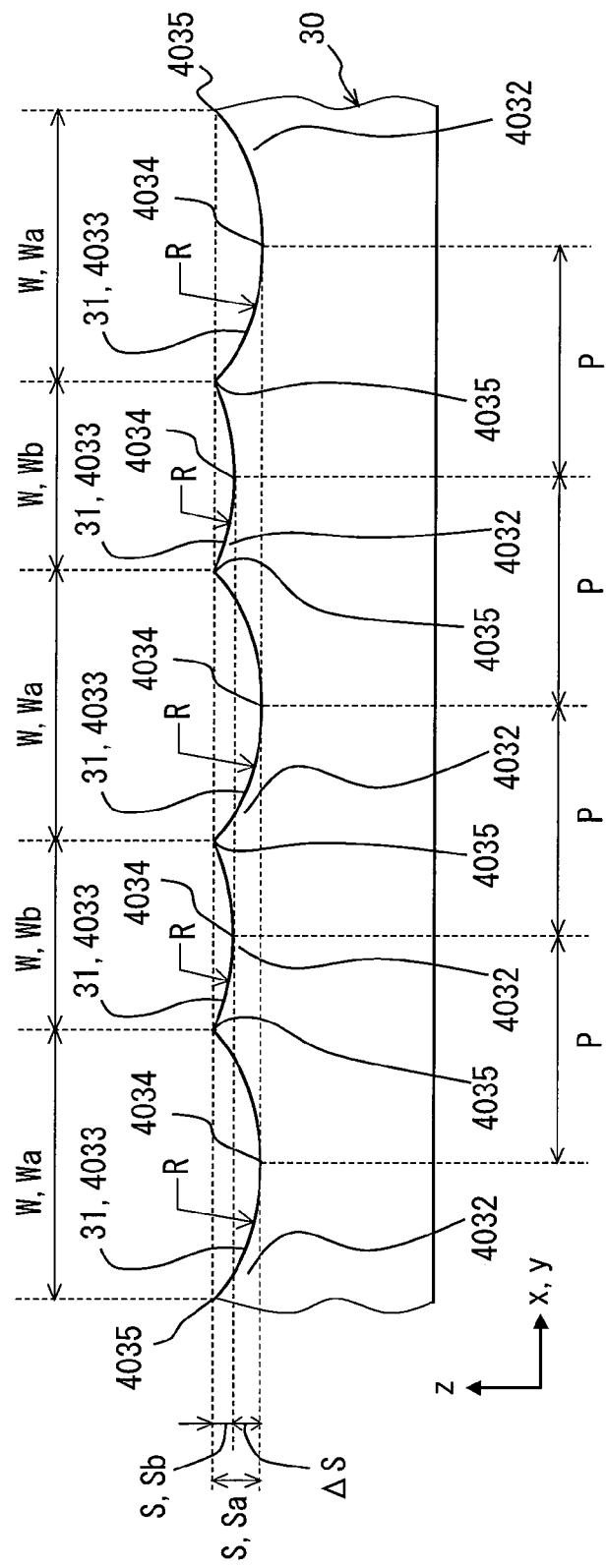
FIG. 21 is a schematic diagram partly showing a screen member included in a fourth embodiment and being equivalent to FIG. 6.

As shown in FIG. 21, the fourth embodiment of the present disclosure is a variant of the first embodiment. In the fourth embodiment, the faces of optical elements 4032 take on as a common curved form a concave curved form to be curved concavely, and are thus formed as arc surface-like curved surfaces 4033. The curved surfaces 4033 of the faces of the optical elements 4032 are dented from a side, on which the screen member is opposed to the laser scanner 10 and optical system 40, to an opposite side in a direction z orthogonal to directions x and y. The deepest concave points are regarded as surface vertices 4034. Specifically, the curved surfaces 4033 of the faces of the optical elements 4032 are formed on the scanning surface 31 on a side, on which the screen member 30 is opposed to the laser scanner 10 and optical system 40, out of the sides of the screen member 30 in the thickness direction (namely, the direction z) of the screen member 30. Owing to the structure, laser light projected from the laser scanner 10 onto the scanning surface 31 is reflected from the curved surfaces 4033 of the faces of the optical elements 4032, thus diffused from the curved surfaces 4033, and emitted to the optical system 40.

The optical elements 4032 adjoining in each of the directions x and y have the margins (contours) of their curved surfaces layered one another, whereby boundaries 4035 are formed among the optical elements. Herein, as for the curved surfaces 4033 of the faces of the optical elements 4032 in the fourth embodiment, a height that is a gap quantity from each of surface vertices 4034 serving as a reference in the direction z to each of the boundaries 4035 (inflection point on a longitudinal section) is defined as a sag quantity S.

According to the fourth embodiment having the same features as the first embodiment except the foregoing feature, the same advantageous effects as the ones of the first embodiment can be exerted.

Fifth Embodiment

Figure 22:
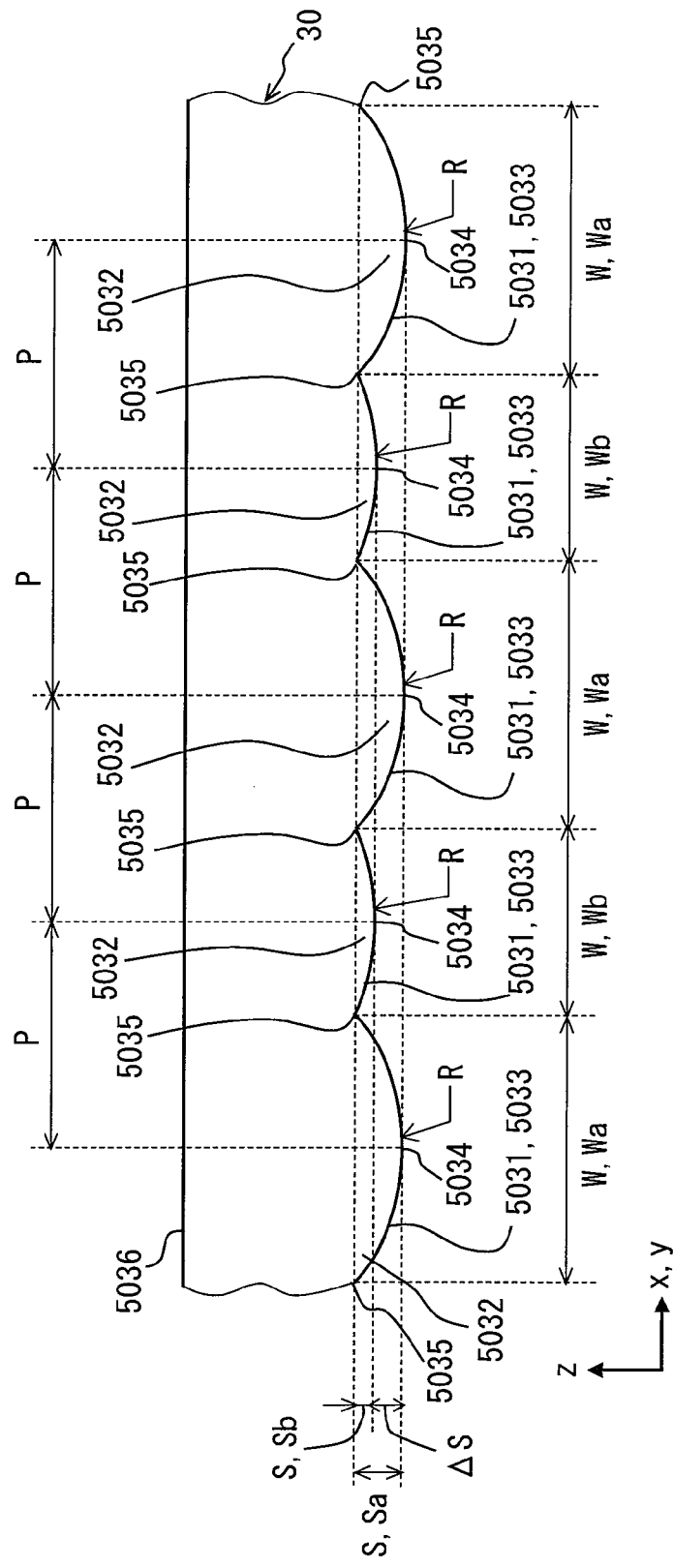
FIG. 22 is a schematic diagram partly showing a screen member included in a fifth embodiment and being equivalent to FIG. 6.

As shown in FIG. 22, the fifth embodiment of the present disclosure is a variant of the first embodiment. Curved surfaces 5033 of the faces of optical elements 5032 in the fifth embodiment are jutted out on a side opposite to a side on which the screen member is opposed to the laser scanner 10 and optical system 40 in a direction z orthogonal to directions x and y. The highest jutted points are regarded as surface vertices 5034. Specifically, the curved surfaces 5033 of the faces of the optical elements 5032 are formed on a scanning surface 5031 on a side of the screen member 30, which is opposite to the side on which the screen member 30 is opposed to the laser scanner 10 and optical system 40 and on which an optical surface 5036 is formed, out of the sides of the screen member 30 in a thickness direction (that is, the direction z). Owing to the structure, laser light to be projected from the laser scanner 10 onto the optical surface 5036 is transmitted by the screen member 30, and fed to the curved surfaces 5033 of the faces of the optical elements 5032. As a result, the laser light is, as shown in FIG. 23, reflected from the curved surfaces 5033 of the faces of the optical elements 5032, transmitted by the screen member 30, diffused from the optical surface 5036, and then emitted to the optical system 40.

Even in the directions x and y in the fifth embodiment, the adjoining optical elements 5032 have the margins (contours) of their curved surfaces 5033 layered one another, whereby boundaries 5035 are formed among the optical elements. As for the curved surfaces 5033 of the faces of the optical elements 5032, a height that is a gap quantity from each of surface vertices 5034, which serve as a reference in the direction z, to each of the boundaries 5035 (inflection point on a longitudinal section) is defined as a sag quantity S. Herein, conformably to the first embodiment, different sag quantities S, that is, large and small sag quantities Sa and Sb are set for the adjoining optical elements 5032 over an entire scanning surface 5031. In addition, conformably to the first embodiment, different element widths W on a longitudinal section containing the surface vertices 5034, that is, large and small element widths Wa and Wb are set for the adjoining optical elements 5032 over the entire scanning surface 5031.

Figure 23:
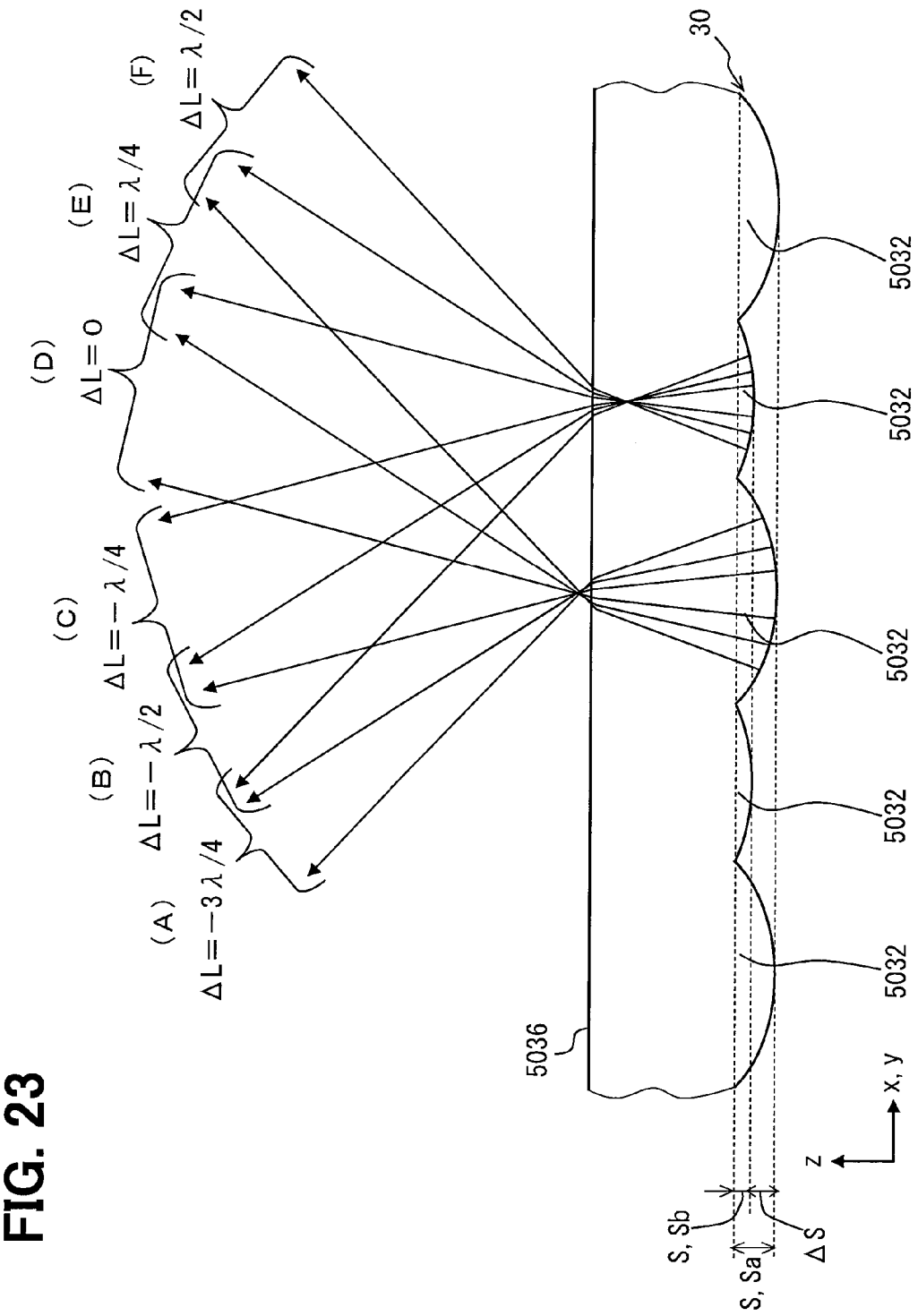
FIG. 23 is a characteristic diagram for explaining an optical path difference of emitted light rays in the fifth embodiment.

In the fifth embodiment, an optical path difference $\Delta L$ between laser light rays that are reflected from the curved surfaces 5033 of the faces of the adjoining optical elements 5032 and emitted through the optical surface 5036 at emission angles $\theta$ is produced as shown in, for example, FIG. 23. Herein, assuming that $\Delta S$ denotes a difference between the sag quantities Sa and Sb of adjoining elements 5032, the optical path difference $\Delta L$ can be expressed as the formula (3) or (4) similarly to the first embodiment. An angle difference $\alpha$ in the emission angle $\theta$ causing the optical path difference $\Delta L$ to change by a wavelength $\lambda$ is expressed as the formula (5) similarly to the first embodiment.

Even in the fifth embodiment, diffraction peaks of diffracted light induced by one optical element 5032 and one of adjoining elements 5032 on both sides of the optical element are deviated from diffraction peaks of diffracted light induced by the one optical element 5032 and the other adjoining element because the diffraction peaks are centered on different emission angles $\theta$ due to the principle identical to that in the first embodiment. As a result of the deviation effect, diffraction peaks induced by one optical element 5032 and either of adjoining elements 5032 are superposed on diffraction valleys induced by the one optical element 5032 and the other adjoining element 5032. Therefore, intensities are hardly increased. In an intensity distribution observed by superposing diffracted light rays, which are induced by one optical element and adjoining elements 5032 on both sides of the one optical element, on one another, an intensity difference is small between each of emission angles $\theta$, on which diffraction peaks are centered, and each of intermediate emission angles $\theta$. Eventually, a luminance variance a discerning person perceives can be suppressed according to the small intensity difference.

As mentioned above, the fifth embodiment adopts such a structure that the optical elements 5032 reflect laser light from the curved surfaces 5033 so as to diffuse the laser light and emit the laser light through the optical surface 5036 on the side opposite to the side on which the curved surfaces 5033 are formed. In the structure, assuming that m denotes an arbitrary odd number equal to or larger than 1 and n denotes the refractive index of the screen member 30, the difference $\Delta S$ between the sag quantities of adjoining optical elements 5032 is supposed to be consistent with $m \cdot \lambda/4/n$. In this case, there is a fear that diffraction peaks caused by one optical element 5032 and either of adjoining elements on both sides of the optical element may be superposed on diffraction peaks caused by the one optical element 5032 and the other adjoining element. This is because in case $\Delta S = m \cdot \lambda/4/n$ is established, the diffraction peaks occur at emission angles which begin with $\theta 0 = \alpha/2/n$ or $-\theta 0 = -\alpha/2/n$ in units of $\pm \alpha$.

In the fifth embodiment, the sag quantity difference $\Delta S$ between adjoining optical elements 5032 is set to a value which allows a formula (15) below to be established. Further, the sag quantity difference $\Delta S$ which allows the formula (15) to be established is preferably set to a value which allows a formula (16) below to be established. In particular, the sag quantity difference $\Delta S$ is preferably set to a value which allows a formula (17) below to be established. With one of the formulae (15), (16), and (17) established, in the fifth embodiment, the difference $\Delta S$ between the sag quantities (Sa and Sb) of adjoining optical elements 5032 is inconsistent with $m \cdot \lambda/4/n$. Thus, superposition of diffraction peaks on other diffraction peaks is reliably avoided. Therefore, credibility in an effect of suppression of a luminance variance a discerning person perceives can be upgraded.

$$\Delta S \neq m \cdot \lambda/4/n \quad (15)$$

$$(2m-1) \cdot \lambda/16/n < \Delta S < (2m+1) \cdot \lambda/16/n \quad (16)$$

$$\Delta S = m \cdot \lambda/8/n \quad (17)$$

Even in the fifth embodiment, similarly to the first embodiment, multi-color laser light is employed. The wavelength $\lambda$ in the formulae (15), (16), and (17) is supposed to be the wavelength of laser light of at least one color. For example, when the wavelength $\lambda$ is supposed to be the wavelength of laser light of one color, the peak wavelength of green laser light or red laser light is preferably supposedly adopted as the wavelength $\lambda$. When the wavelength $\lambda$ is supposed to be the wavelength of each of laser light rays of two or more colors, m is set to a value that varies depending on the color. Thus, the formulae (15), (16), and (17) can be established.

When the peak wavelength of green laser light is supposedly adopted as the wavelength $\lambda$, the sag quantity difference $\Delta S$ [unit: nm] is set to a value which allows a formula (18) based on the formula (15), preferably, a formula (19) based on the formula (16), or more preferably, a formula (20) based on the formula (17) to be established.

$$\Delta S \neq 490 \cdot m/4/n \text{ to } 530 \cdot m/4/n \quad (18)$$

$$490 \cdot (2m-1)/16/n < \Delta S < 530 \cdot (2m+1)/16/n \quad (19)$$

$$\Delta S = 490 \cdot m/8/n \text{ to } 530 \cdot m/8/n \quad (20)$$

When the peak wavelength of red laser light is supposedly adopted as the wavelength $\lambda$, the sag quantity difference $\Delta S$ [unit: nm] is set to a value which allows a formula (21) based on the formula (15), preferably, a formula (22) based on the formula (16), or more preferably, a formula (23) based on the formula (17) to be established.

$$\Delta S \neq 600 \cdot m/4/n \text{ to } 650 \cdot m/4/n \quad (21)$$

$$600 \cdot (2m-1)/16/n < \Delta S < 650 \cdot (2m+1)/16/n \quad (22)$$

$$\Delta S = 600 \cdot m/8/n \text{ to } 650 \cdot m/8/n \quad (23)$$

According to the fifth embodiment having the same features as the first embodiment except the foregoing feature, the same advantageous effects as the ones of the first embodiment can be exerted.

Other Embodiments

The embodiments of the present disclosure have been described so far. The present disclosure is not limited to the embodiments but can be applied to various embodiments and combinations without a departure from the gist of the present disclosure.

Figure 24:
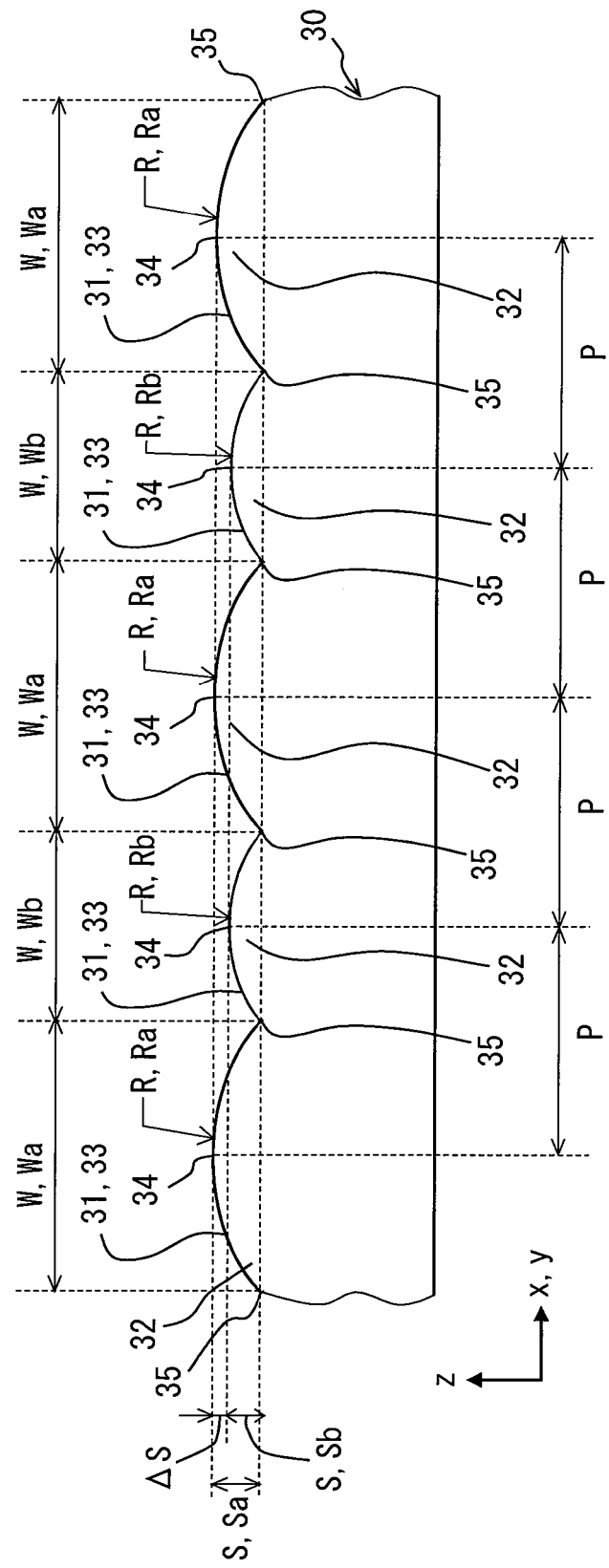
FIG. 24 is a schematic diagram partly showing a screen member included in a variant 1 applied to the first embodiment and being equivalent to FIG. 6.

More particularly, as a variant 1 relating to the first, fourth, and fifth embodiments, as shown in FIG. 24, the radius of curvature R (Ra>Rb) that differs between adjoining optical elements 32, 4032, or 5032 may be designated conformably to the third embodiment. FIG. 24 shows the variant 1 applied to the first embodiment.

Figure 25:
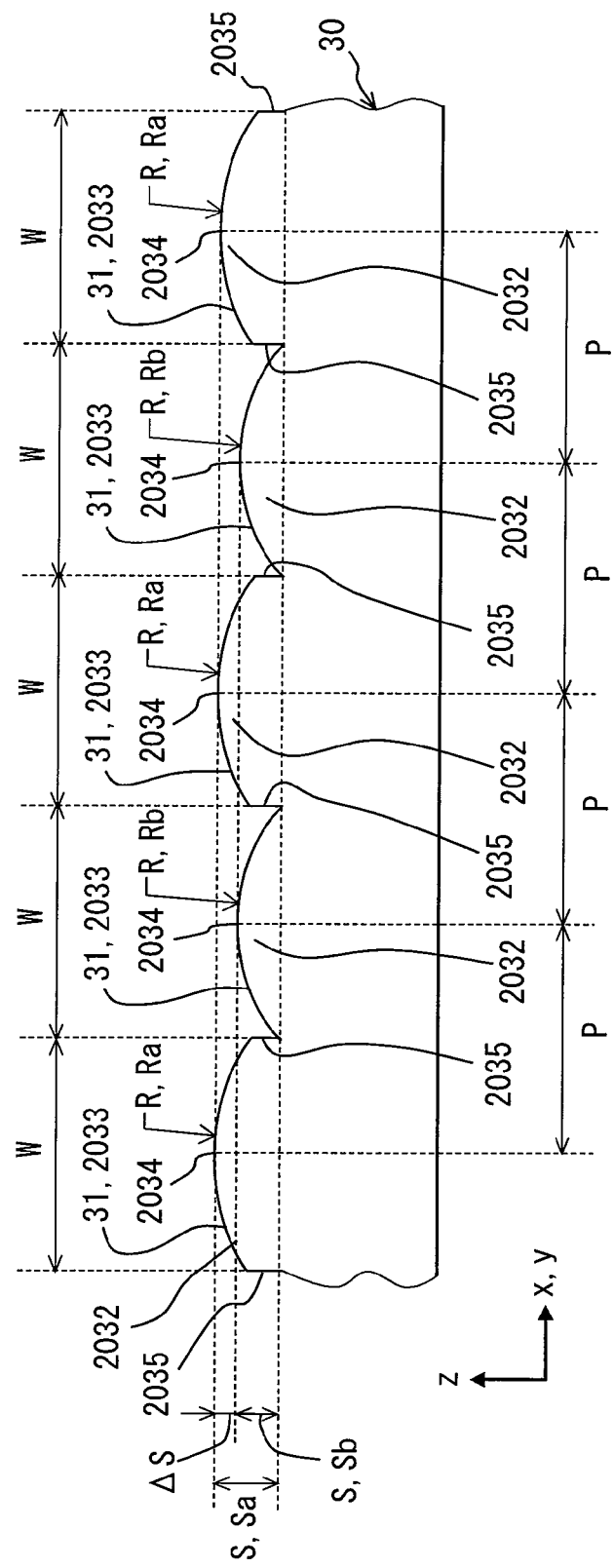
FIG. 25 is a schematic diagram partly showing a screen member included in a variant 2 applied to the second embodiment and being equivalent to FIG. 19.
Figure 26:
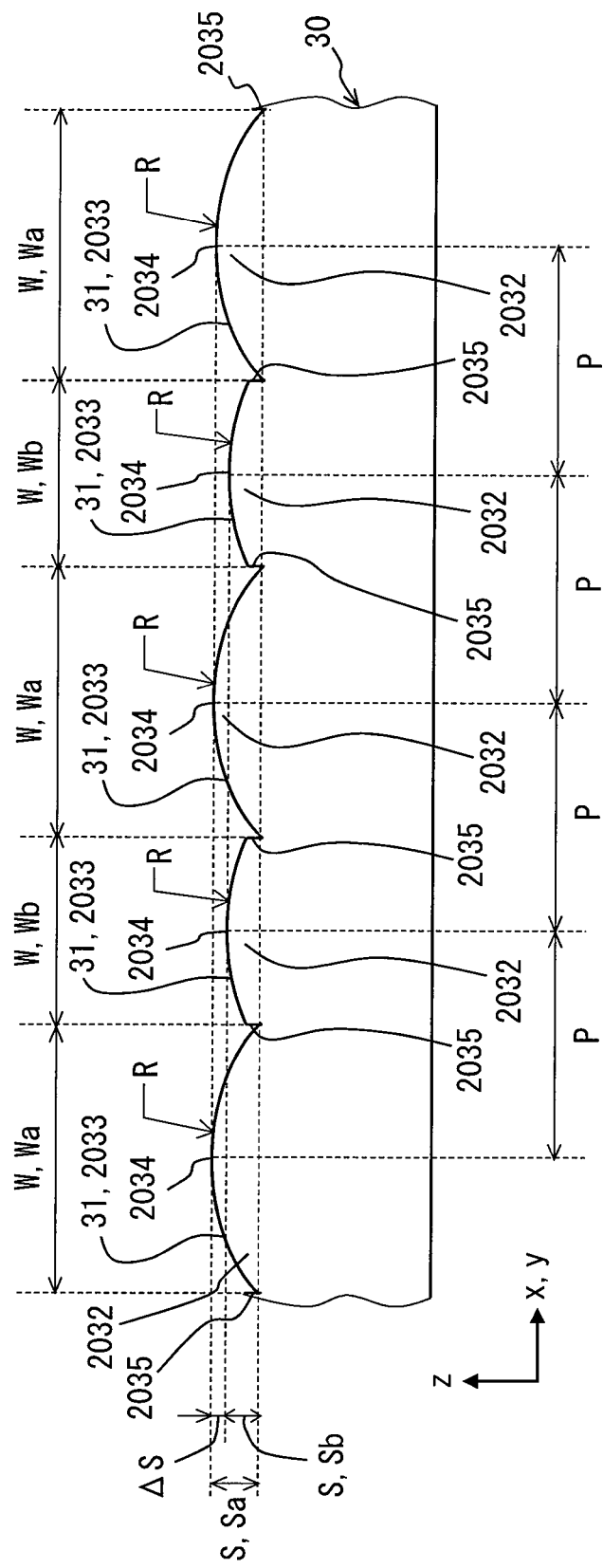
FIG. 26 is a schematic diagram partly showing a screen member included in a variant 3 applied to the second embodiment and being equivalent to FIG. 19.

As a variant 2 relating to the second embodiment, as shown in FIG. 25, the radius of curvature R (Ra>Rb) that differs between adjoining optical elements 2032 may be designated conformably to the third embodiment. As a variant 3 relating to the second embodiment, as shown in FIG. 26, the element width W (Wa and Wb) that differs between adjoining optical elements 2032 may be designated conformably to the first embodiment.

Figure 27:
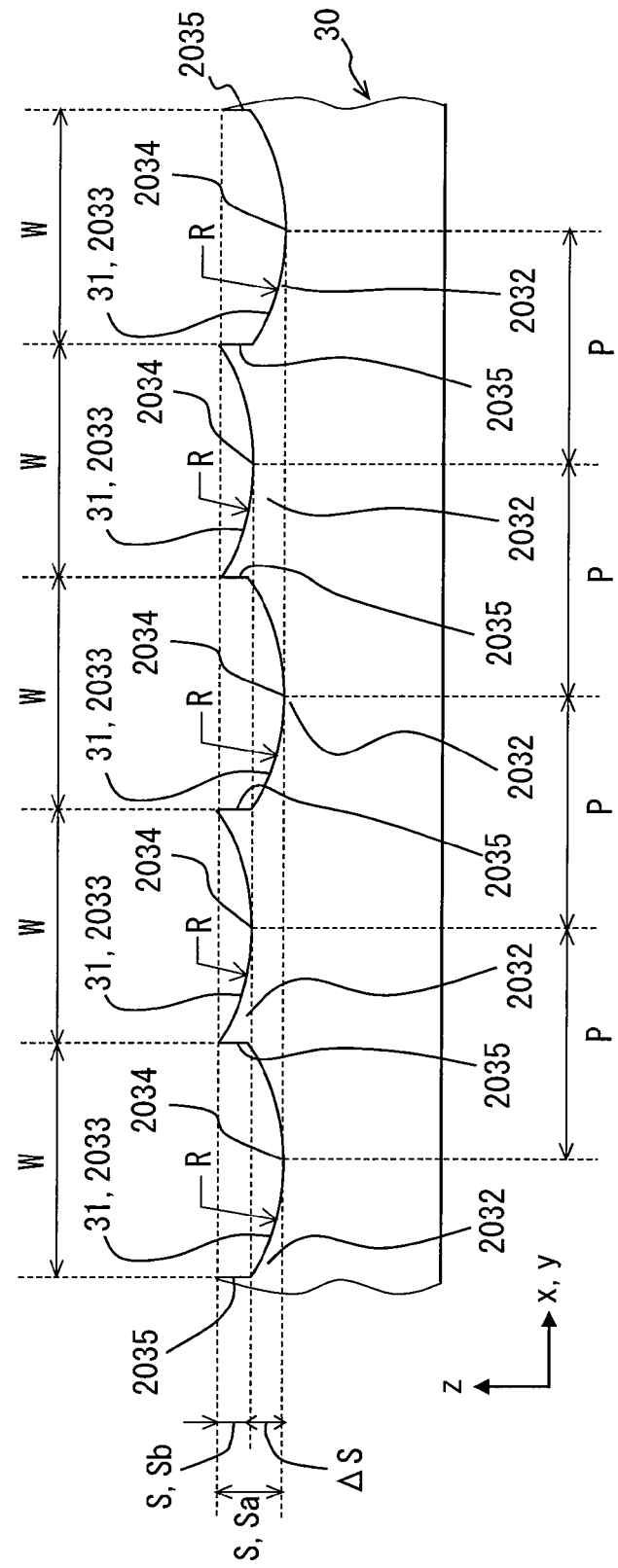
FIG. 27 is a schematic diagram partly showing a screen member included in a variant 4 applied to the second embodiment and being equivalent to FIG. 19.
Figure 28:
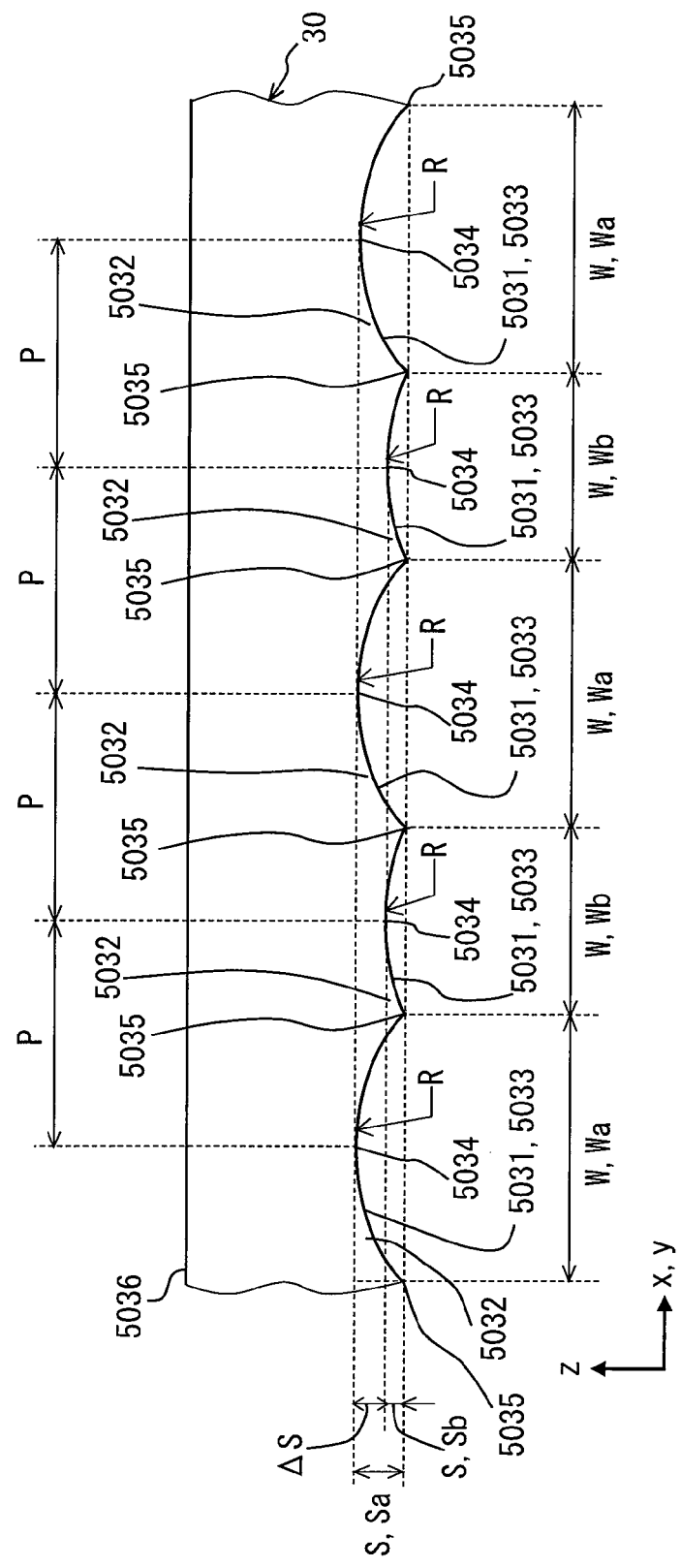
FIG. 28 is a schematic diagram partly showing a screen member included in the variant 4 applied to the fifth embodiment and being equivalent to FIG. 22.

As a variant 4 relating to the second, third, and fifth embodiments, as shown in FIGS. 27 and 28, the curved surfaces 2033, 3033, or 5033 having a concavely curved form to be curved concavely may be adopted conformably to the fourth embodiment. FIG. 27 shows the variant 4 applied to the second embodiment, and FIG. 28 shows the variant 4 applied to the fifth embodiment.

Figure 29:
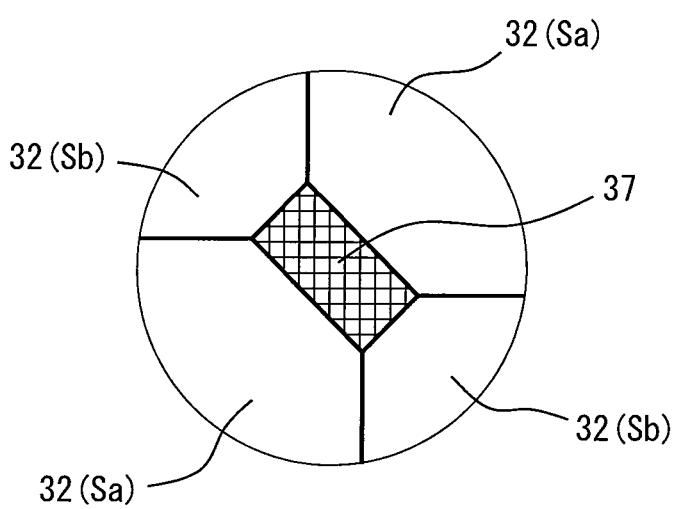
FIG. 29 is a schematic diagram partly showing a screen member included in a variant 5 applied to the first embodiment and being equivalent to FIG. 17.

As a variant 5 relating to the first, fourth, and fifth embodiments, as shown in FIG. 29, each of the optical elements 32, 4032, or 5032 that have the large sag quantity Sa and take on a substantially octagonal shape may adjoin four other elements, which have the large sag quantity Sa, with planar parts 37 (hatched area in FIG. 29) interposed among them. In this case, each of the optical elements 32, 4032, or 5032 having the small sag quantity Sb adjoin four other elements 32, 4032, or 5032, which have the small sag quantity Wb, with the planar parts 37 among them. FIG. 29 shows the variant 5 applied to the first embodiment.

Figure 30:
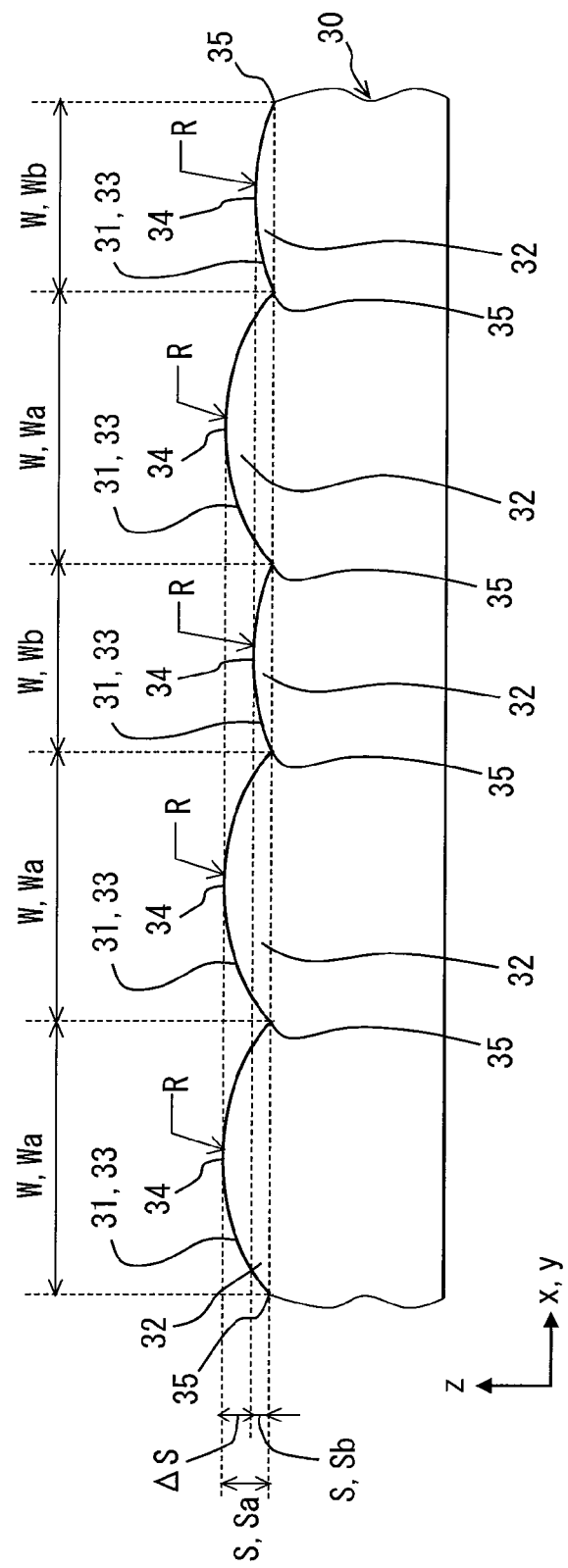
FIG. 30 is a schematic diagram partly showing a screen member included in variants 6 and 8 applied to the first embodiment and being equivalent to FIG. 6.

As a variant 6 relating to the first to fifth embodiments, as shown in FIG. 30, as long as the sag quantity S differs between adjoining optical elements 32, 2032, 3032, 4032, or 5032 in part of the scanning surface 31 or 5031, the sag quantity S may be set to an equal value for the adjoining elements in the remaining part of the surface 31 or 5031. FIG. 30 shows the variant 6 applied to the first embodiment.

As a variant 7 relating to the fifth embodiment, the element width W may be, conformably to the second and third embodiment, set to an equal value for the optical elements 5032 over the entire scanning surface 5031. As a variant 8 relating to the first to fifth embodiments, as shown in FIG. 30, while the element width W may differ between adjoining optical elements 32, 2032, 3032, 4032, or 5032 in part of the scanning surface 31 or 5031, the element width W may be set to an equal value for the adjoining elements in the remaining part of the surface 31 or 5031. FIG. 30 also shows the variant 8 applied to the first embodiment.

As a variant 9 relating to the first to fifth embodiments, the element width W (Wa or Wb) that differs between the horizontal direction x and vertical direction y may be set for the optical elements 32, 2032, 3032, 4032, or 5032. As a variant 10 relating to the first to fifth embodiments, the radius of curvature R (Ra or Rb) that differs between the horizontal direction x and vertical direction y may be set for the optical elements 32, 2032, 3032, 4032, or 5032.

As a variant 11 relating to the first to fifth embodiments, three or more sag quantities S may be designated. As a variant 12 relating to the first, fourth, and fifth embodiments, three or more element widths W may be designated. As a variant 13 relating to the first to fifth embodiments, the curved surfaces 33, 2033, 3033, 4033, or 5033 that transmit laser light projected onto the scanning surface 31 or 5031 so as to diffuse and emit the laser light may be formed as the faces of the optical elements 32, 2032, 3032, 4032, or 5032 serving as microlenses.

As a variant 14 relating to the first to fifth embodiments, a scanning mirror capable of being turned about two axes may be adopted as the MEMS 26 of the laser scanner 10 serving as a projector. As a variant 15 relating to the first to fifth embodiments, an element other than the windshield 90 may be adopted as a display member forming the projection surface 91 of the vehicle 1. For example, a combiner or the like that is bonded to an interior-side surface of the windshield 90 or formed separately from the windshield 90 may be adopted. Further, as a variant 16 relating to the first to fifth embodiments, the present disclosure may be applied to any of moving entities including boats, ships, and airplanes other than the vehicle 1.

The invention claimed is:

1. A head-up display device that projects a display image onto a projection surface of a moving entity and thus displays a virtual image of the display image so that the virtual image can be discerned inside the moving entity, comprising:
   a projector that projects laser light carrying the display image; and
   a screen member that has a plurality of optical elements arrayed in a form of a grating, and diffuses and introduces the laser light, which emanates from the projector and enters the optical elements, toward the projection surface, wherein
   the optical elements have curved surfaces, which are either convexly curved or concavely curved and take on a common curved form, as faces of the optical elements, and diffuse the laser light which is emitted to the projection surface from the curved surfaces; and
   a sag quantity from each of surface vertices of the curved surfaces to each of boundaries among the optical elements differs between adjoining optical elements.

2. The head-up display device according to claim 1, wherein:
   the optical elements reflect the laser light from the curved surfaces to diffuse the laser light and emit the laser light from the curved surfaces; and
   assuming that m denotes an odd number equal to or larger than 1, $\lambda$ denotes the wavelength of laser light, and $\Delta S$ denotes a difference between the sag quantities of adjoining optical elements, a relation of $\Delta S \neq m \cdot \lambda/4$ is established.

3. The head-up display device according to claim 2, wherein a relation of $(2m-1) \cdot \lambda/16 < \Delta S < (2m+1) \cdot \lambda/16$ is established.

4. The head-up display device according to claim 3, wherein a relation of $\Delta S = m \cdot \lambda/8$ is established.

5. The head-up display device according to claim 1, wherein:
   the optical elements reflect the laser light from the curved surfaces to diffuse the laser light and emit the laser light through an optical surface on a side opposite to the curved surfaces; and
   assuming that m denotes an odd number equal to or larger than 1, $\lambda$ denotes the wavelength of laser light, $\Delta S$ denotes a difference between the sag quantities of adjoining optical elements, and n denotes the refractive index of the screen member, a relation of $\Delta S \neq m \cdot \lambda/4/n$ is established.

6. The head-up display device according to claim 5, wherein a relation of $(2m-1) \cdot \lambda/16/n < \Delta S < (2m+1) \cdot \lambda/16/n$ is established.

7. The head-up display device according to claim 6, wherein a relation of $\Delta S = m \cdot \lambda/8/n$ is established.

8. The head-up display device according to claim 2, wherein:
   the projector projects multi-color laser light, as the laser light, including green laser light whose peak wavelength falls within a range from 490 nm to 530 nm; and
   the peak wavelength of the green laser light is defined as $\lambda$.

9. The head-up display device according to claim 2, wherein:
   the projector projects multi-color laser light, as the laser light, including red laser light whose peak wavelength falls within a range from 600 nm to 650 nm; and
   the peak wavelength of the red laser light is defined as $\lambda$.

10. The head-up display device according to claim 1, wherein;
    the optical elements reflect the laser light from the curved surfaces to diffuse the laser light and emit the laser light from the curved surfaces; and
    assuming that m denotes an odd number equal to or larger than 1, and $\Delta S$ [unit: nm] denotes a difference between the sag quantities of adjoining optical elements, a relation of $\Delta S \neq 490 \cdot m/4$ to $530 \cdot m/4$ is established.

11. The head-up display device according to claim 10, wherein a relation of $490 \cdot (2m-1)/16 < \Delta S < 530 \cdot (2m+1)/16$ is established.

12. The head-up display device according to claim 11, wherein a relation of $\Delta S = 490 \cdot m/8$ to $530 \cdot m/8$ is established.

13. The head-up display device according to claim 1, wherein:
    the optical elements reflect the laser light from the curved surfaces to diffuse the laser light and emit the laser light from the curved surfaces; and
    assuming that m denotes an odd number equal to or larger than 1, and $\Delta S$ [unit: nm] denotes a difference between the sag quantities of adjoining optical elements, a relation of $\Delta S \neq 600 \cdot m/4$ to $650 \cdot m/4$ is established.

14. The head-up display device according to claim 13, wherein $600 \cdot (2m-1)/16 < \Delta S < 650 \cdot (2m+1)/16$ is established.

15. The head-up display device according to claim 14, wherein a relation of $\Delta S = 600 \cdot m/8$ to $650 \cdot m/8$ is established.

16. The head-up display device according to claim 1, wherein:
    the optical elements reflect the laser light from the curved surfaces to diffuse the laser light and emit the laser light through an optical surface on a side opposite to the curved surfaces; and
    assuming that m denotes an odd number equal to or larger than 1, $\Delta S$ [unit: nm] denotes a difference between the sag quantities of adjoining optical elements, and n denotes the refractive index of the screen member, a relation of $\Delta S \neq 490 \cdot m/4/n$ to $530 \cdot m/4/n$ is established.

17. The head-up display device according to claim 16, wherein a relation of $490 \cdot (2m-1)/16/n < \Delta S < 530 \cdot (2m+1)/16/n$ is established.

18. The head-up display device according to claim 17, wherein a relation of $\Delta S = 490 \cdot m/8/n$ to $530 \cdot m/8/n$ is established.

19. The head-up display device according to claim 1, wherein:
    the optical elements reflect the laser light from the curved surfaces to diffuse the laser light and emit the laser light through an optical surface on a side opposite to the curved surfaces; and
    assuming that m denotes an odd number equal to or larger than 1, $\Delta S$ [unit: nm] denotes a difference between the sag quantities of adjoining optical elements, and n denotes the refractive index of the screen member, a relation of $\Delta S \neq 600 \cdot m/4/n$ to $650 \cdot m/4/n$ is established.

20. The head-up display device according to claim 19, wherein a relation of $600 \cdot (2m-1)/16/n < \Delta S < 650 \cdot (2m+1)/16/n$ is established.

21. The head-up display device according to claim 20, wherein a relation of $\Delta S = 600 \cdot m/8/n$ to $650 \cdot m/8/n$ is established.

22. The head-up display device according to claim 1, wherein the optical elements are configured so that an element width between the boundaries differs between adjoining optical elements.

23. The head-up display device according to claim 1, wherein the optical elements adjoin with each other through the boundaries having a linear shape.

24. The head-up display device according to claim 1, wherein the optical elements adjoin with each other through the boundaries having a shape of a step surface.

25. The head-up display device according to claim 1, wherein the optical elements are configured so that the radius of curvature of each of the curved surfaces differs between adjoining optical elements.

26. The head-up display device according to claim 1, wherein:
   the optical elements adjoin with each other through the boundaries having a shape of a step surface; and
   the optical elements are configured so that the radius of curvature of each of the curved surfaces and the element width between the boundaries are equal among the optical elements.

27. The head-up display device according to claim 1, wherein the sag quantity differs between adjoining optical elements over the entire surface of the screen member on a side of the screen member on which the curved surfaces of the faces of the optical elements are formed.

* * * * *